(12) United States Patent
Sakuma et al.

(10) Patent No.: US 11,768,482 B2
(45) Date of Patent: Sep. 26, 2023

(54) INFORMATION PROCESSING APPARATUS, LADDER-PROGRAM GENERATION APPARATUS, INFORMATION PROCESSING METHOD, LADDER-PROGRAM GENERATION METHOD, METHOD OF MANUFACTURING PRODUCT, AND RECORDING MEDIUM

(71) Applicant: CANON KABUSHIKI KAISHA, Tokyo (JP)

(72) Inventors: Kota Sakuma, Kanagawa (JP); Shinji Murakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/382,171

(22) Filed: Jul. 21, 2021

(65) Prior Publication Data

US 2022/0035340 A1 Feb. 3, 2022

(30) Foreign Application Priority Data

Jul. 30, 2020 (JP) .................................. 2020-128756
Apr. 27, 2021 (JP) .................................. 2021-074564

(51) Int. Cl.
*G05B 19/4155* (2006.01)
*G06F 8/51* (2018.01)
*G06F 8/40* (2018.01)
*G06F 3/0484* (2022.01)

(52) U.S. Cl.
CPC ....... *G05B 19/4155* (2013.01); *G06F 3/0484* (2013.01); *G06F 8/40* (2013.01); *G06F 8/51* (2013.01); *G05B 2219/31372* (2013.01)

(58) Field of Classification Search
None
See application file for complete search history.

(56) References Cited

U.S. PATENT DOCUMENTS

| | | | | |
|---|---|---|---|---|
| 5,142,469 A * | 8/1992 | Weisenborn | ......... | G05B 19/056 706/919 |
| 5,285,376 A * | 2/1994 | Struger | ................ | G05B 19/056 706/900 |
| 5,764,507 A * | 6/1998 | Chuo | .................... | G05B 19/056 700/83 |
| 10,719,643 B2 * | 7/2020 | Horikawa | ............... | G05B 19/05 |
| 2004/0117773 A1* | 6/2004 | Nicolle | ................ | G05B 19/056 717/136 |
| 2014/0075411 A1* | 3/2014 | Diep | ........................ | G06F 8/34 717/109 |
| 2017/0139690 A1* | 5/2017 | Pesarese | .................... | G06F 8/41 |
| 2020/0081550 A1* | 3/2020 | Fuchs | ................. | G06F 3/04886 |
| 2020/0310733 A1* | 10/2020 | Fujimura | ............. | G06F 3/04883 |
| 2022/0035340 A1* | 2/2022 | Sakuma | ................ | G06F 3/0484 |

FOREIGN PATENT DOCUMENTS

| | | |
|---|---|---|
| JP | H04-139504 | 5/1992 |
| JP | H04-303205 | 10/1992 |
| JP | H10-161883 | 6/1998 |
| JP | 2001-022412 | 1/2001 |

* cited by examiner

*Primary Examiner* — Jason D Mitchell
(74) *Attorney, Agent, or Firm* — Venable LLP

(57) ABSTRACT

An information processing apparatus includes a processing portion configured to perform information processing. The processing portion is configured to obtain definition information in which a first mnemonic and a second mnemonic different from the first mnemonic are associated with each other.

24 Claims, 18 Drawing Sheets

1701

| LINE NUMBER | COMMAND | DEVICE |
|---|---|---|
| 0 | LD | XB |
| 1 | LDI | M1 |
| 2 | AND | L2 |
| 3 | LDP | T3 |
| 4 | ANDFI | BC |
| 5 | ORB | |
| 6 | OR | M5 |
| 7 | ANB | |
| 8 | OUT | Y6 |
| 9 | LDPI | M10 |
| 10 | MPS | |
| 11 | AND | L20 |
| 12 | MPS | |
| 13 | ANI | M30 |
| 14 | SET | Y40 |
| 15 | MPP | |
| 16 | AND | M50 |
| 17 | RST | Y60 |
| 18 | MPP | |
| 19 | OUT | Y70 |

1702

| LINE NUMBER | COMMAND | DEVICE |
|---|---|---|
| 0 | LD | R1011 |
| 1 | LDB | MR1 |
| 2 | AND | LR2 |
| 3 | LDP | T3 |
| 4 | ANFB | BC |
| 5 | ORL | |
| 6 | OR | MR5 |
| 7 | ANL | |
| 8 | OUT | R2006 |
| 9 | LDPB | MR10 |
| 10 | MPS | |
| 11 | AND | LR20 |
| 12 | MPS | |
| 13 | ANB | MR30 |
| 14 | SET | R2400 |
| 15 | MPP | |
| 16 | AND | MR50 |
| 17 | RES | R2600 |
| 18 | MPP | |
| 19 | OUT | R2700 |

FIG.9
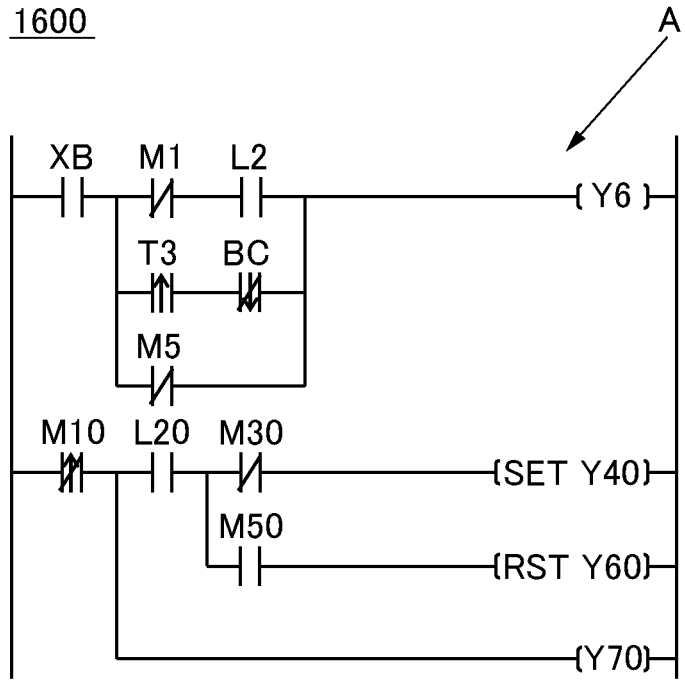
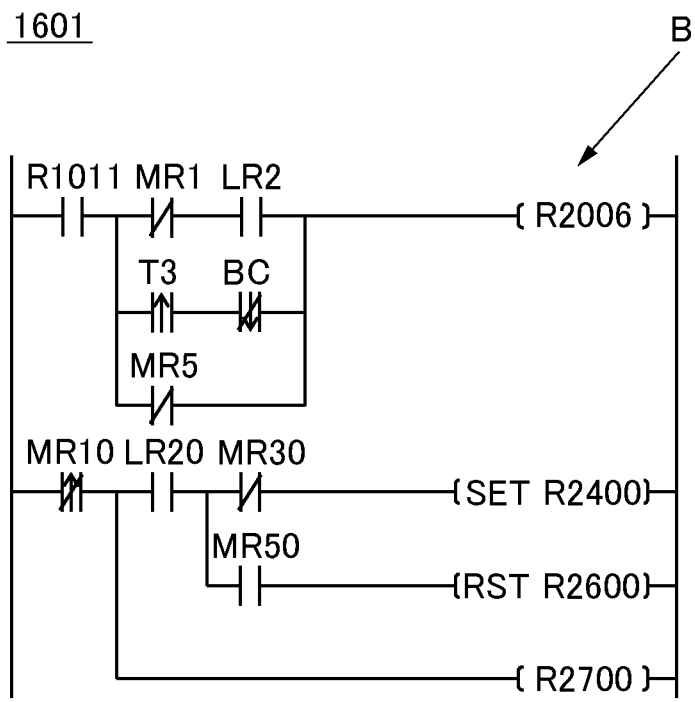

FIG.10

| LINE NUMBER | COMMAND | DEVICE |
|---|---|---|
| 0 | LD | XB |
| 1 | LDI | M1 |
| 2 | AND | L2 |
| 3 | LDP | T3 |
| 4 | ANDFI | BC |
| 5 | ORB | |
| 6 | OR | M5 |
| 7 | ANB | |
| 8 | OUT | Y6 |
| 9 | LDPI | M10 |
| 10 | MPS | |
| 11 | AND | L20 |
| 12 | MPS | |
| 13 | ANI | M30 |
| 14 | SET | Y40 |
| 15 | MPP | |
| 16 | AND | M50 |
| 17 | RST | Y60 |
| 18 | MPP | |
| 19 | OUT | Y70 |

1701

| LINE NUMBER | COMMAND | DEVICE |
|---|---|---|
| 0 | LD | R1011 |
| 1 | LDB | MR1 |
| 2 | AND | LR2 |
| 3 | LDP | T3 |
| 4 | ANFB | BC |
| 5 | ORL | |
| 6 | OR | MR5 |
| 7 | ANL | |
| 8 | OUT | R2006 |
| 9 | LDPB | MR10 |
| 10 | MPS | |
| 11 | AND | LR20 |
| 12 | MPS | |
| 13 | ANB | MR30 |
| 14 | SET | R2400 |
| 15 | MPP | |
| 16 | AND | MR50 |
| 17 | RES | R2600 |
| 18 | MPP | |
| 19 | OUT | R2700 |

1702

| 1800 | O | | A | | B | |
|---|---|---|---|---|---|---|
| | DEVICE | | DEVICE | | DEVICE | |
| DEVICE NAME | DEVICE NUMBER | DEVICE NAME | DEVICE NUMBER | DEVICE NAME | DEVICE NUMBER |
| INPUT | 0 | X | 0 | R | 1000 |
| INPUT | 1 | X | 1 | R | 1001 |
| : | : | : | : | : | : |
| INPUT | 10 | X | A | R | 1010 |
| INPUT | 11 | X | B | R | 1011 |
| : | : | : | : | : | : |
| INPUT | 159 | X | 9F | R | 1915 |
| OUTPUT | 0 | Y | 0 | R | 2000 |
| OUTPUT | 1 | Y | 1 | R | 2001 |
| : | : | : | : | : | : |
| OUTPUT | 111 | Y | 6F | R | 2615 |
| OUTPUT | 112 | Y | 70 | R | 2700 |
| : | : | : | : | : | : |
| OUTPUT | 159 | Y | 9F | R | 2915 |
| INTERNAL RELAY | 0 | M | 0 | MR | 0 |
| : | : | : | : | : | : |
| INTERNAL RELAY | 49 | M | 49 | MR | 301 |
| LATCH RELAY | 0 | L | 0 | LR | 0 |
| : | : | : | : | : | : |
| LATCH RELAY | 49 | L | 49 | LR | 301 |
| TIMER | 0 | T | 0 | T | 0 |
| : | : | : | : | : | : |
| TIMER | 49 | T | 49 | T | 49 |
| LINK RELAY | 0 | B | 0 | B | 0 |
| : | : | : | : | : | : |
| LINK RELAY | 31 | B | 1F | B | 1F |

| LINE NUMBER | COMMAND | DEVICE |
|---|---|---|
| 0 | BIT, A, ON, TOP | INPUT, 11 |
| 1 | BIT, A, OFF, TOP | INTERNAL RELAY, 1 |
| 2 | BIT, A, ON, TOP | LATCH RELAY, 2 |
| 3 | BIT, PULSE RISE, ON, TOP | TIMER, 3 |
| 4 | BIT, PULSE FALL, OFF, SERIES | LINK RELAY, 12 |
| 5 | BLOCK CONNECTION, PARALLEL | |
| 6 | BIT, A, ON, PARALLEL | INTERNAL RELAY, 5 |
| 7 | BLOCK CONNECTION, SERIES | |
| 8 | OUTPUT, DIRECT OUTPUT | OUTPUT, 6 |
| 9 | BIT, PULSE RISE, OFF, TOP | INTERNAL RELAY, 10 |
| 10 | OUTPUT CONNECTION, PUSH | |
| 11 | BIT, A, ON, TOP | LATCH RELAY, 20 |
| 12 | OUTPUT CONNECTION, PUSH | |
| 13 | BIT, A, OFF, TOP | INTERNAL RELAY, 30 |
| 14 | OUTPUT CONNECTION, SET | OUTPUT, 64 |
| 15 | OUTPUT CONNECTION, POP | |
| 16 | BIT, A, ON, TOP | INTERNAL RELAY, 50 |
| 17 | OUTPUT CONNECTION, RESET | OUTPUT, 96 |
| 18 | OUTPUT CONNECTION, POP | |
| 19 | OUTPUT, DIRECT OUTPUT | OUTPUT, 112 |

| MNEMONIC A | | MNEMONIC 0 | |
|---|---|---|---|
| DEVICE | | DEVICE | |
| DEVICE NAME | DEVICE NUMBER | DEVICE NAME | DEVICE NUMBER |
| B | C | LINK RELAY | 12 |
| L | 2 | | |
| L | 20 | | |
| M | 1 | INTERNAL RELAY | 1 |
| M | 10 | INTERNAL RELAY | 10 |
| M | 30 | INTERNAL RELAY | 30 |
| M | 5 | INTERNAL RELAY | 5 |
| M | 50 | INTERNAL RELAY | 50 |
| T | 3 | TIMER | 3 |
| X | B | INPUT | 11 |
| Y | 40 | OUTPUT | 64 |
| Y | 6 | OUTPUT | 6 |
| Y | 60 | OUTPUT | 96 |
| Y | 70 | OUTPUT | 112 |

2301 / 2303

| MNEMONIC B | | MNEMONIC 0 | |
|---|---|---|---|
| DEVICE | | DEVICE | |
| DEVICE NAME | DEVICE NUMBER | DEVICE NAME | DEVICE NUMBER |
| B | C | LINK RELAY | 12 |
| LR | 2 | | |
| LR | 20 | | |
| MR1 | 1 | INTERNAL RELAY | 1 |
| MR10 | 10 | INTERNAL RELAY | 10 |
| MR30 | 30 | INTERNAL RELAY | 30 |
| MR5 | 5 | INTERNAL RELAY | 5 |
| MR50 | 50 | INTERNAL RELAY | 50 |
| R1011 | 1011 | INPUT | 11 |
| R2006 | 2006 | OUTPUT | 6 |
| R2400 | 2400 | OUTPUT | 64 |
| R2600 | 2600 | OUTPUT | 96 |
| R2700 | 2700 | OUTPUT | 112 |
| T | 3 | TIMER | 3 |

2302 / 2303

2310

| MNEMONIC A COMMAND | MNEMONIC 0 COMMAND |
|---|---|
| LD | BIT, A, ON, TOP |
| ANB | BLOCK CONNECTION, SERIES |
| AND | BIT, A, ON, TOP |
| ANDFI | |
| ANI | |
| LDI | |
| LDP | |
| LDPI | |
| MPP | |
| MPS | |
| OR | |
| ORB | |
| OUT | |
| RST | |
| SET | |

2311 / 2313

| MNEMONIC B COMMAND | MNEMONIC 0 COMMAND |
|---|---|
| LD | BIT, A, ON, TOP |
| ANB | |
| AND | BIT, A, ON, TOP |
| ANFB | |
| ANL | BLOCK CONNECTION, SERIES |
| LDB | |
| LDP | |
| LDPB | |
| MPP | |
| MPS | |
| OR | |
| ORL | |
| OUT | |
| RES | |
| SET | |

2312 / 2313

INFORMATION PROCESSING APPARATUS, LADDER-PROGRAM GENERATION APPARATUS, INFORMATION PROCESSING METHOD, LADDER-PROGRAM GENERATION METHOD, METHOD OF MANUFACTURING PRODUCT, AND RECORDING MEDIUM

BACKGROUND OF THE INVENTION

Field of the Invention

The present invention relates to information processing.

Description of the Related Art

In a production line, sequence control is performed for sequentially controlling operations of an apparatus in accordance with a predetermined procedure. In the production line, a production apparatus such as an automatic assembly apparatus is disposed; and a programmable logic controller (PLC) is mainly used as a controller that performs the sequence control on the production apparatus. For programming the PLC for causing the PLC to perform the sequence control, a program written under a predetermined language specification is used. For reducing man-hours in design of such a program, Japanese Patent Application Publication No. H04-303205 discloses an apparatus that automatically generates a program such as a ladder program.

SUMMARY OF THE INVENTION

According to a first aspect of the present invention, an information processing apparatus includes a processing portion configured to perform information processing. The processing portion is configured to obtain definition information in which a first mnemonic and a second mnemonic different from the first mnemonic are associated with each other.

According to a second aspect of the present invention, a ladder-program generation apparatus includes a processing portion configured to perform information processing. The processing portion is configured to obtain definition information in which a first mnemonic and a second mnemonic different from the first mnemonic are associated with each other, and translate a first ladder program written in the first mnemonic into a second ladder program written in the second mnemonic, by using the definition information.

According to a third aspect of the present invention, an information processing method performed by a processing portion, wherein the processing portion is configured to obtain definition information in which a first mnemonic and a second mnemonic different from the first mnemonic are associated with each other.

According to a fourth aspect of the present invention, a ladder-program generation method performed by a processing portion, wherein the processing portion is configured to obtain definition information in which a first mnemonic and a second mnemonic different from the first mnemonic are associated with each other, and translate a first ladder program written in the first mnemonic into a second ladder program written in the second mnemonic, by using the definition information.

Further features of the present invention will become apparent from the following description of exemplary embodiments with reference to the attached drawings.

BRIEF DESCRIPTION OF THE DRAWINGS

FIG. 9 is a diagram illustrating one example of ladder diagrams of an embodiment.

FIG. 10 is a diagram illustrating one example of a ladder program of an embodiment.

FIG. 13 is a diagram illustrating one example of intermediate information of an embodiment.

FIG. 17 is a diagram illustrating one example of device definition information and command definition information of an embodiment.

DESCRIPTION OF THE EMBODIMENTS

When a production apparatus is designed and made, the production apparatus may be required to have a plurality of PLCs with different language specifications for satisfying the performance required for the production apparatus. In addition, when the design of the production apparatus is changed (for example, when the production apparatus is modified), a PLC of the production apparatus may be replaced with another PLC having a different language specification. In such cases, the program used for a PLC needs to be written in mnemonic corresponding to a language used for the PLC. Thus, the apparatus that generates the program is also required to generate the program written in mnemonic corresponding to a language used for the PLC of the production apparatus.

First Embodiment

Figure 1A:
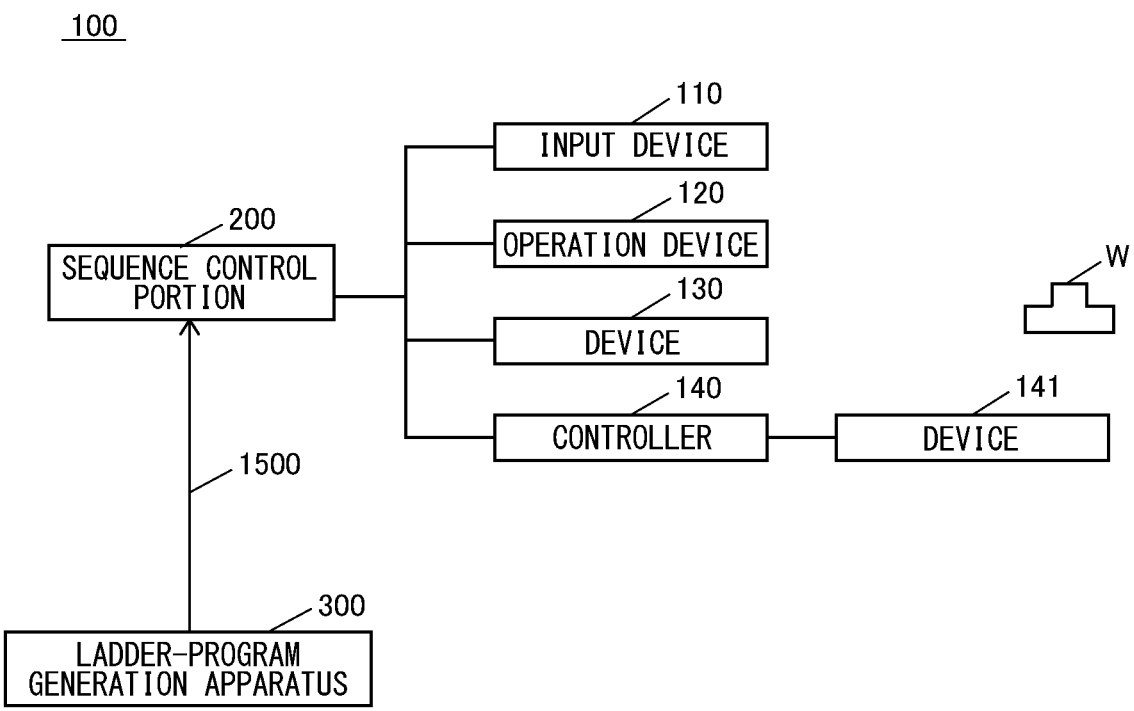
FIG. 1A is a block diagram of a production apparatus of an embodiment.

Hereinafter, an embodiment of the present invention will be described in detail with reference to the accompanying drawings. FIG. 1A is a block diagram of a production apparatus 100 of the embodiment. The production apparatus 100 includes an input device 110, an operation device 120, a device 130, a device 141, a controller 140, a sequence control portion 200, and a ladder-program generation apparatus 300.

The sequence control portion 200 is a programmable logic controller (PLC). The sequence control portion 200 is connected with the input device 110, the operation device 120, the device 130, and the controller 140. The controller 140 is connected with the device 141. The sequence control portion 200 includes a computer that controls the devices connected with the sequence control portion 200, depending on a ladder program 1500. The sequence control portion 200 obtains the ladder program 1500 from the ladder-program generation apparatus 300. The input device 110 is a device, such as a sensor, that notifies the sequence control portion 200 of the state of each of the devices of the production apparatus 100. The operation device 120 is a device, such as a touch panel or push-button switches, that is used for an operator to give an instruction to the sequence control portion 200. The device 130 is a device, such as a cylinder, that is operated by signals ON and OFF. The device 141 is a device, such as a multi-axis robot or an image processing device, that can perform complicated operation under the control performed by the controller 140, which is a dedicated computer.

Thus, the sequence control portion 200 controls the devices, which include the devices 130 and 141, depending on the ladder program 1500. The devices of the production apparatus 100 operate under the sequence control of the sequence control portion 200, performed depending on the ladder program 1500. In this manner, each process of a manufacturing method is performed, so that a product W is manufactured.

Figure 1B:
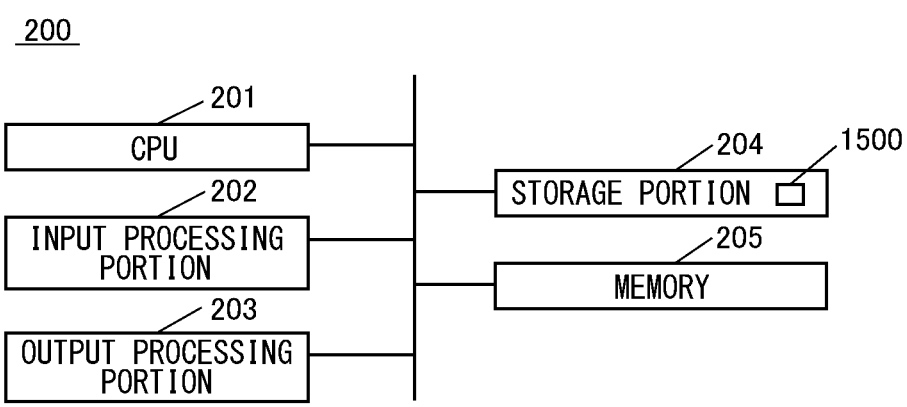
FIG. 1B is a diagram illustrating system components of a sequence control portion of an embodiment.

FIG. 1B is a diagram illustrating system components of the sequence control portion 200 of the embodiment. The sequence control portion 200 includes a CPU 201, an input processing portion 202, an output processing portion 203, a storage portion 204, and a memory 205. The CPU 201 is a computer, which receives instructions and performs various processes including a computing process, a data creation process, a writing process to write data to the memory 205, and a reading process to read data from the memory 205. The input processing portion 202 is an interface that receives, via a terminal block or a connector, signals sent from the input device 110, the operation device 120, the controller 140, and the like, to the sequence control portion 200. The output processing portion 203 is an interface that sends, via a terminal block or a connector, signals from the sequence control portion 200 to the operation device 120, the device 130, the controller 140, and the like. The storage portion 204 stores the ladder program 1500 to be executed by the CPU 201, and program comments. The storage portion 204 is a portion that stores data. The storage portion 204 may be a storage device, such as a RAM, a ROM, or a memory card. The memory 205 is a storage device that stores information, such as computation results, in the computing process performed by the CPU 201. The memory 205 may be a storage device, such as a RAM or a ROM.

Figure 2:
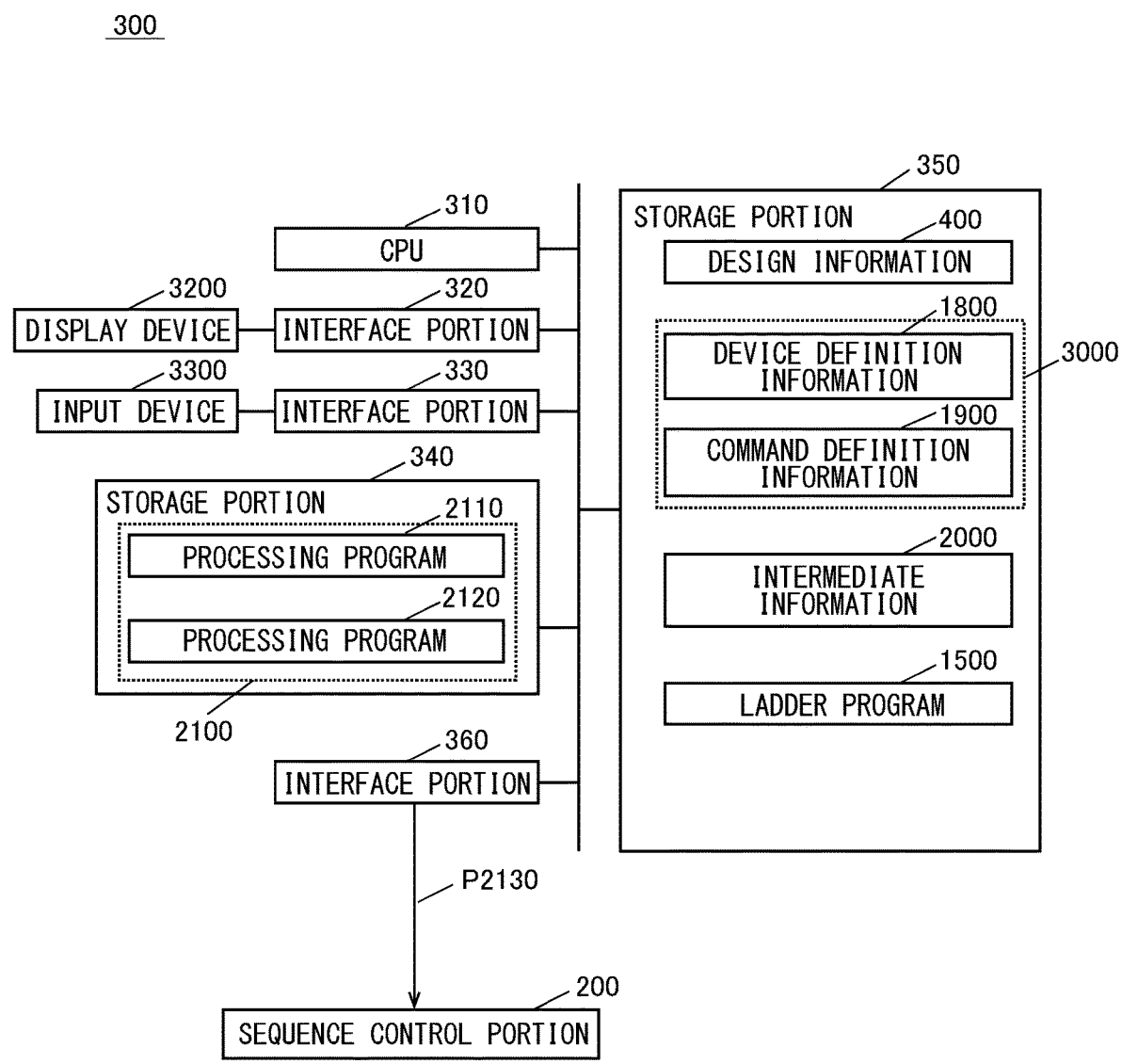
FIG. 2 is a block diagram of a ladder-program generation apparatus of an embodiment.

FIG. 2 is a block diagram of the ladder-program generation apparatus 300 of the embodiment. The ladder-program generation apparatus 300 is an information processing apparatus. In addition, the ladder-program generation apparatus 300 may be a general-purpose computer. Note that although the following description will be made for a case where the ladder-program generation apparatus 300 is a general-purpose computer, the ladder-program generation apparatus 300 may be a dedicated computer.

The ladder-program generation apparatus 300 includes a CPU 310, an interface portion 320, a display device 3200 connected to the interface portion 320, an interface portion 330, and an input device 3300 connected to the interface portion 330. In addition, the ladder-program generation apparatus 300 includes a storage portion 340 and a storage portion 350. The CPU 310 is one example of a processing portion that performs information processing. The display device 3200 is one example of a display portion, and is a display that displays an image. The input device 3300 is one example of an input portion; and is a device, such as a keyboard or a mouse, that is operated by a user. By the user operating the input device 3300, input information corresponding to the operation is received by the CPU 310. The ladder-program generation apparatus 300 also includes an interface portion 360. The interface portion 360 is one example of an output portion. The interface portion 360 outputs the ladder program 1500 generated by the CPU 310. The ladder program 1500 is a program obtained through the processing performed by the CPU 310. The output destination of the ladder program 1500 is, for example, the sequence control portion 200 illustrated in FIG. 1A, or an external device (not illustrated) such as an external storage.

The CPU 310 performs computation, depending on a given program 2100. The interface portion 320 performs processing for causing the display device 3200 to display an image on information. The interface portion 330 processes information data inputted through the input device 3300. The storage portion 340 stores the program 2100 to be executed by the CPU 310. The storage portion 340 is a storage device, such as an HDD or an SSD. In the present embodiment, the storage portion 340 is a computer-readable non-transitory storage medium that stores the program 2100.

The program 2100 is a program that causes the CPU 310 to execute a later-described information processing method, that is, a ladder-program generation method. The program 2100 includes a processing program 2110 and a processing program 2120.

The program 2100 may be supplied to the storage portion 340 via a network or a disk drive (not illustrated). In addition, the program 2100 stored in the storage portion 340 may be updated by an update program. The storage medium that stores the program 2100 may not be an HDD or an SSD. For example, the storage medium that stores the program 2100 may be a recording disk, such as a magnetic disk or an optical disk, or a storage device such as a flash memory.

The storage portion 350 stores design information 400, a translation table 3000, intermediate information 2000 generated by the CPU 310, and the ladder program 1500 generated by the CPU 310. The translation table 3000 shows definition information. The translation table 3000 is a table used by the CPU 310 for translating the intermediate information 2000 into the ladder program 1500, and contains device definition information 1800 and command definition information 1900. The storage portion 350 is a portion that stores data, and is a storage device such as an HDD or an SSD.

Preferably, the ladder program 1500 has a file format, such as a text file format, in which a program is written in mnemonic for allowing a user to easily check the program. In this case, it is preferable that the sequence control portion 200 has a function to translate the ladder program 1500 into a binary format program.

Figure 3:
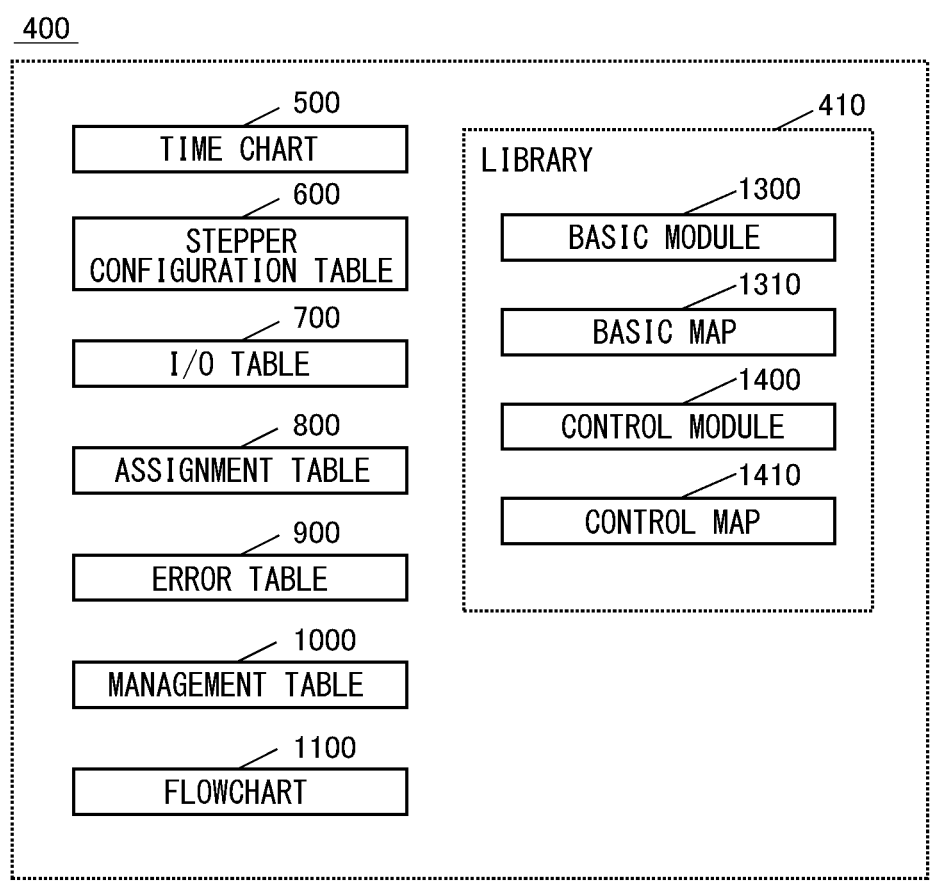
FIG. 3 is a diagram illustrating components of design information of an embodiment.

FIG. 3 is a diagram illustrating components of the design information 400 of the embodiment. The design information 400 is required when the intermediate information is generated. Specifically, the design information 400 is the information in which operations of each of the devices of the production apparatus are designed, and is created by a user. The method of supplying the design information 400 to the ladder-program generation apparatus 300 is not limited to a particular method. For example, the design information 400 may be created by a user operating the input device 3300 and using a function of the ladder-program generation apparatus 300. In another case, the design information 400 may be created by a user by using an external computer, and may be supplied to the ladder-program generation apparatus 300 via an external storage (not illustrated) or the like.

The design information 400 includes a time chart 500, a stepper configuration table 600, an I/O table 700, an assignment table 800, an error table 900, a management table 1000, a flowchart 1100, and a library 410. The design information 400 has only to be electronic information that can be managed, and the format thereof is not limited to a particular format. Thus, the design information 400 may have a text file format or a database format.

The library 410 is a group of programs, which has multiplicity of use and can be used also in different production apparatuses. The library 410 includes one or more types of basic module 1300, a basic map 1310, one or more types of control module 1400, and a control map 1410.

Figure 4A:
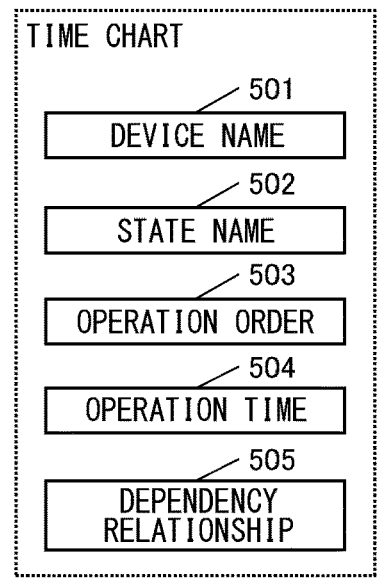
FIG. 4A is a diagram illustrating components of a time chart of an embodiment.

FIG. 4A is a diagram illustrating components of the time chart 500 of the embodiment. The time chart 500 is a document used for a user to examine operation times of a series of operations of the production apparatus that is in a normal state. Specifically, the time chart 500 is a document that shows the order of all operations of each of the devices 130 and 141, and a transition time of each operation of the devices 130 and 141. The time chart 500 includes information elements that are a device name 501, a state name 502, an operation order 503, an operation time 504, and a dependency relationship 505.

The device name 501 is given to identify each of the devices 130 and 141. The state name 502 is given to identify an operation state of each of the devices 130 and 141. The operation state represents an operation position of each device, and two or more operation states are defined for each device. For example, if the device is a two-position cylinder, the device has two operation states, and is given the state name 502, for example, "go" and "return". The operation order 503 represents the change in all operations of each of the devices 130 and 141, that is, the order of all operations of each of the devices 130 and 141. The operation time 504 represents an operation time of each operation, that is, a time taken from a start to an end of each operation. The dependency relationship 505 is an information element that represents a cause-and-effect relationship between the completion of an operation of one device and the start of an operation of another device, which is different from the one device.

Figure 4B:
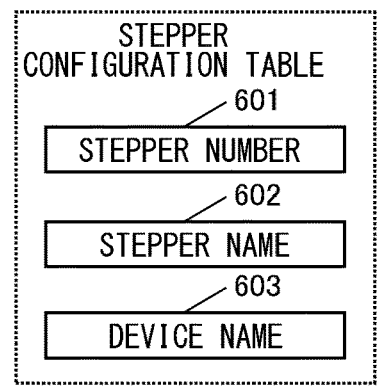
FIG. 4B is a diagram illustrating components of a stepper configuration table of an embodiment.

FIG. 4B is a diagram illustrating components of the stepper configuration table 600 of the embodiment. As illustrated in FIG. 4B, the stepper configuration table 600 is a list that includes information elements that are a stepper number 601, a stepper name 602, and a device name 603.

A stepper is a unit of the input device 110, the device 130, and the device 141; and the stepper is formed for easily controlling the devices of the unit. The stepper has the following three characteristics. First, one stepper includes an input device and a device that are used for the same control purpose and controlled in the same manner. Second, devices that belong to an identical stepper operate in synchronization with each other in the stepper, and another device that operates asynchronously with the devices is managed by another stepper. Third, an input device and a device can belong to a single stepper, but cannot belong to a plurality of steppers.

Note that one stepper can operate asynchronously with another stepper, and is affected by the operation of the other stepper. For example, one stepper checks the operation state of another stepper, and stops or restarts its operation depending on the operation state of the other stepper. Such a relationship between steppers that affect each other is expressed by the dependency relationship 505 included in the time chart 500.

The stepper number 601 is the number of a stepper used for a program to identify the stepper. The stepper name 602 is the name of the stepper used for a user that uses the production apparatus, to identify the stepper. The device name 603 is the name of each of the devices 130 and 141 that belong to the stepper.

Figure 4C:
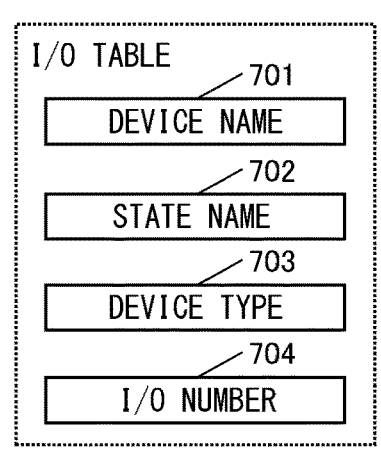
FIG. 4C is a diagram illustrating components of an I/O table of an embodiment.

FIG. 4C is a diagram illustrating components of the I/O table 700 of the embodiment. The I/O table 700 is a list of the input device 110, the operation device 120, the device 130, and the controller 140 illustrated in FIG. 1A and connected to the sequence control portion 200, illustrated in FIG. 1B, via the input processing portion 202 and the output processing portion 203.

As illustrated in FIG. 4C, the I/O table 700 includes information elements that are a device name 701, a state name 702, a device type 703, and an I/O number 704. The device name 701 is given to identify each of the input device 110, the operation device 120, the device 130, and the device 141, which are illustrated in FIG. 1A. The state name 702 is given to identify the state of each of the input device 110, the operation device 120, the device 130, and the device 141. The device type 703 is an identifier used for identifying each of the input device 110, the operation device 120, the device 130, and the device 141. For example, if the device 130 is a cylinder, the identifier indicates that the device 130 is a single solenoid or a double solenoid. The I/O number 604 is the number of a terminal that is connected to a device with the device name 701 in the input processing portion 202 and the output processing portion 203.

Figure 5A:
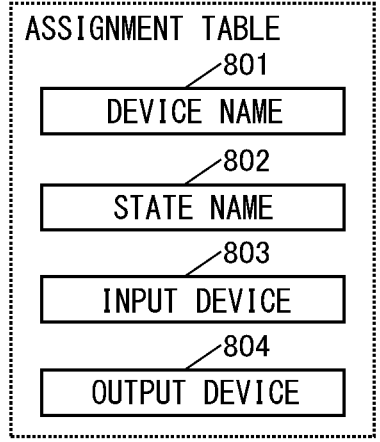
FIG. 5A is a diagram illustrating components of an assignment table of an embodiment.

FIG. 5A is a diagram illustrating components of the assignment table 800 of the embodiment. The assignment table 800 is a device assignment list that is related to an interface for displaying and executing switches disposed in the operation device 120. The assignment table 800 includes information elements that are a device name 801, a state name 802, an input device 803, and an output device 804.

Each switch is provided for a corresponding state of a device, and a lamp of the switch can be turned on and off. If a switch whose lamp is turned off is pressed, the switch becomes active. The lamp of the switch is turned on if the production apparatus is in an operation state.

The device name 801 is given to identify each of the devices 130 and 141, which are illustrated in FIG. 1A. The state name 802 is given to identify the operation state of each of the devices 130 and 141. The input device 803 is information that specifies a device that serves as a condition to turn on a switch. The output device 804 is information that specifies a device that is operated after a switch is pressed.

Figure 5B:
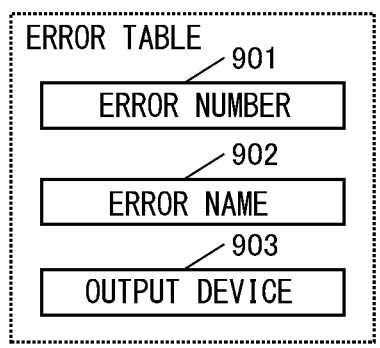
FIG. 5B is a diagram illustrating components of an error table of an embodiment.

FIG. 5B is a diagram illustrating components of the error table 900 of the embodiment. The error table 900 is a list that manages errors that may occur in the production apparatus. The error table 900 includes information elements that are an error number 901, an error name 902, and an output device 903. The error number 901 is the number of an error given to identify the error. The error name 902 is the name of the error given to identify the error. The output device 903 is information on the assignment of a flag to the memory 205 illustrated in FIG. 1B. The flag is used to notify the ladder program 1500 (FIG. 2) of the occurrence of an error.

Figure 5C:
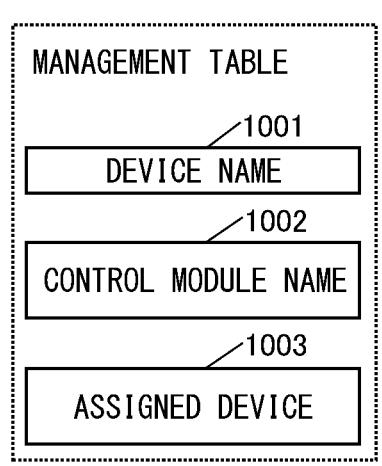
FIG. 5C is a diagram illustrating components of a management table of an embodiment.

FIG. 5C is a diagram illustrating components of the management table 1000 of the embodiment. The management table 1000 is a table that manages the types and the number of the control modules 1400 illustrated in FIG. 3 and incorporated into the ladder program 1500 (FIG. 2), and manages the assignment of devices to the memory 205 illustrated in FIG. 1B. As illustrated in FIG. 5C, the management table 1000 includes information elements that are a device name 1001, a control module name 1002, and an assigned device 1003.

The device name 1001 is given to identify each of the devices, including the device 141 illustrated in FIG. 1A. The control module name 1002 is given to identify a type of the control module 1400 illustrated in FIG. 3. The control module name 1002 is selected from a list of names, which are extracted from names of the control module 1400 stored in the library 410 illustrated in FIG. 3. The assigned device 1003 is information on the assignment of a memory area and an I/O number to the memory 205 illustrated in FIG. 1B. The memory area and the I/O number are used by the control module 1400 illustrated in FIG. 3.

Figure 6:
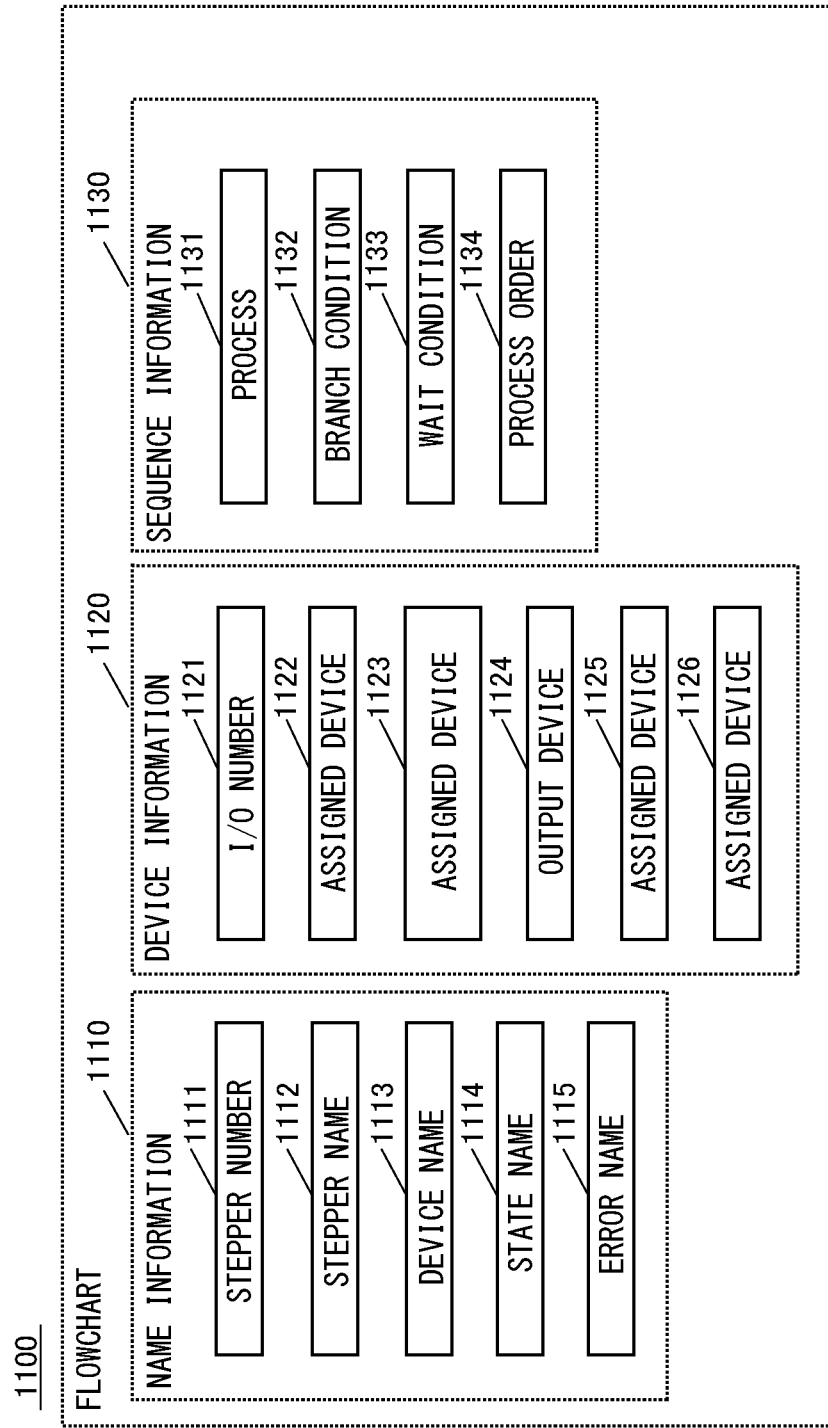
FIG. 6 is a diagram illustrating components of a flowchart of an embodiment.
Figure 7A:
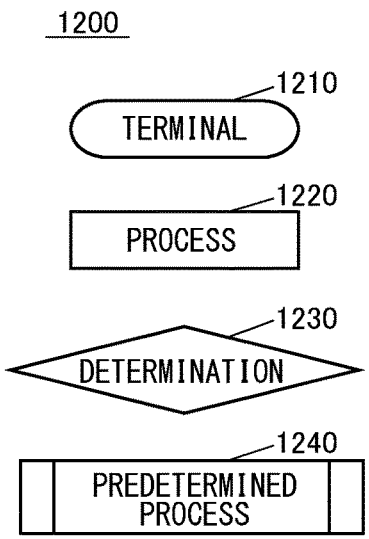
FIG. 7A is a diagram illustrating figures of components of a flowchart of an embodiment.

FIG. 6 is a diagram illustrating components of the flowchart 1100 (FIG. 3) of the embodiment. The flowchart 1100 shows a flow of processes of the ladder program 1500 illustrated in FIG. 2, and is created for each stepper. FIG. 7A is a diagram illustrating figures 1200 used for the flowchart of the embodiment.

The flowchart 1100 illustrated in FIG. 6 is created by combining the FIG. 1200 illustrated in FIG. 7A. As illustrated in FIG. 6, the flowchart 1100 includes name information 1110, device information 1120, and sequence information 1130. The name information 1110 is information on name. The device information 1120 is information on device. The sequence information 1130 is information on sequence.

As illustrated in FIG. 6, the name information 1110 includes a stepper number 1111, a stepper name 1112, a device name 1113, a state name 1114, and an error name 1115.

The stepper number 1111 is the number of a stepper to identify the stepper, and is the same as the stepper number 601 of the stepper configuration table 600 illustrated in FIG. 4B. The stepper name 1112 is the name of the stepper for a user of the production apparatus to identify the stepper, and is the same as the stepper name 602 of the stepper configuration table 600 illustrated in FIG. 4B. The device name 1113 is given to identify each of the devices 130 and 141, which are illustrated in FIG. 1A. The state name 1114 is given to identify the operation state of each of the devices 130 and 141. The error name 1115 is the name of an error given to identify the error, and is the same as the error name 902 of the error table 900 of FIG. 5B.

As illustrated in FIG. 6, the device information 1120 includes an I/O number 1121, an assigned device 1122, an assigned device 1123, an output device 1124, an assigned device 1125, and an assigned device 1126.

The I/O number 1121 is the number of a terminal that is connected to a device with the device name 701 in the input processing portion 202 and the output processing portion 203 of FIG. 1B, and is the same as the I/O number 704 of the I/O table 700 of FIG. 4C.

The assigned device 1122 is a device given to the figures 1200 of FIG. 7A, which are arranged in the flowchart 1100. The assigned device 1122 is a device to identify a process of the ladder program 1500.

The assigned device 1123 is information on the assignment of a memory area and an I/O number, used by the control module 1400 illustrated in FIG. 3, to the memory 205 illustrated in FIG. 1B. The assigned device 1123 is the same as the assigned device 1003 of the management table 1000 illustrated in FIG. 5C.

The output device 1124 is information on the assignment of a flag, used to notify the ladder program 1500 (FIG. 2) of the occurrence of an error, to the memory 205. The output device 1124 is the same as the output device 903 of the error table 900 of FIG. 5B.

The assigned device 1125 is information on the assignment of a flag that is related to an apparatus mode, such as an automatic or manual mode. The assigned device 1125 is the same as an assigned device 1311 of a later-described basic map 1310 of FIG. 7B.

The assigned device 1126 is information on the assignment of a flag that is related to an apparatus state, such as a start state, a stop state, or an error state, and is the same as an assigned device 1312 of the later-described basic map 1310 of FIG. 7B.

The sequence information 1130 illustrated in FIG. 6 includes information elements that are a process 1131, a branch condition 1132, a wait condition 1133, and a process order 1134.

The process 1131 is information on the change in all operations of the devices 130 and 141 illustrated in FIG. 1A, information on the change in the state of a flag in the memory 205 illustrated in FIG. 1B, and information on the computation to be performed. The information on the change in all operations of the devices 130 and 141 is the same as the operation order 503 included in the time chart 500 of FIG. 4A.

The branch condition 1132 is information to branch the process by determining the I/O number 704 of FIG. 4C, the assigned device 1003 of FIG. 5C, a flag information in the memory 205 of FIG. 1B, or the like.

The wait condition 1133 is information around a pause caused by a timer, or information to wait for the permission to operate expressed by the dependency relationship 505 illustrated in FIG. 4A and given from another stepper.

The process order 1134 is information on the order of the process 1131, the branch condition 1132, and the wait condition 1133.

The terminal 1210 illustrated in FIG. 7A is a figure selected for indicating the start and the end of the ladder program, and for indicating that the process 1131 of FIG. 6 deals with a device error. Inside the figure that represents the terminal 1210, the name information 1110 illustrated in FIG.

6 is written. In addition, outside the figure that represents the terminal 1210, the device information 1120 illustrated in FIG. 6 is written.

The process 1220 illustrated in FIG. 7A is a figure selected for indicating that the process 1131 of FIG. 6 deals with other than device error. Inside the figure that represents the process 1220, the name information 1110 illustrated in FIG. 6 is written. In addition, outside the figure that represents the process 1220, the device information 1120 illustrated in FIG. 6 is written.

The determination 1230 illustrated in FIG. 7A is a figure selected for indicating the branch condition 1132 and the wait condition 1133 illustrated in FIG. 6. Inside the figure that represents the determination 1230, the name information 1110 illustrated in FIG. 6 is written. In addition, outside the figure that represents the determination 1230, the device information 1120 illustrated in FIG. 6 is written.

The predefined process 1240 illustrated in FIG. 7A is a figure selected for indicating the start of an independent sequence. Inside the figure that represents the predefined process 1240, the name information 1110 illustrated in FIG. 6 is written. In addition, outside the figure that represents the predefined process 1240, the device information 1120 illustrated in FIG. 6 is written.

The flowchart 1100 (FIG. 3) is formed by connecting the figures of the terminal 1210, the process 1220, the determination 1230, and the predefined process 1240, which are illustrated in FIG. 7A, via lines in accordance with the information of the process order 1134 illustrated in FIG. 6. Thus, the flowchart 1100 contains the information of the time chart 500, the stepper configuration table 600, the I/O table 700, the error table 900, the management table 1000, the basic map 1310, and the control map 1410.

In the creation of the flowchart 1100, however, the above-described information does not include the branch condition 1132, the wait condition 1133, the process 1131 to which the process is branched by the branch condition 1132, and the predefined process 1240 to which the process is branched by the same. Since the information other than the above-described information needs determination of a software designer, the software designer examines the flowchart 1100 and completes it. That is, except for the ladder program 1500, the flexible software design including the branch condition 1132, the wait condition 1133, the process 1131 to which the process is branched by the branch condition 1132, and the predefined process 1240 to which the process is branched by the same can be achieved by the flowchart 1100 alone.

Figure 7B:
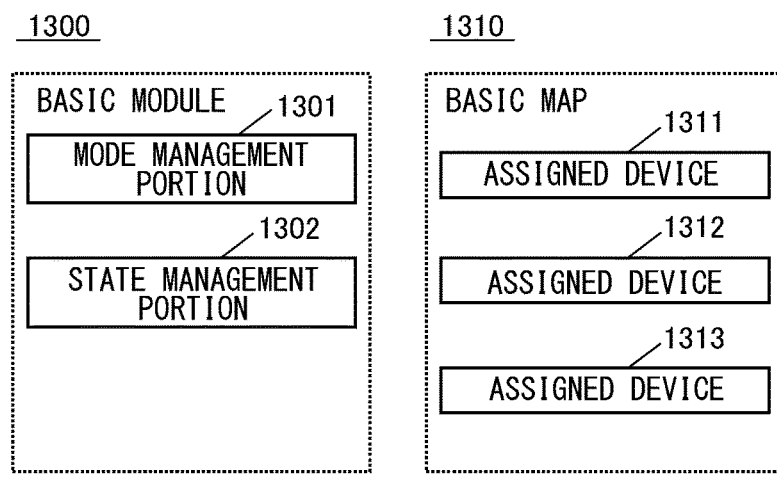
FIG. 7B is a diagram illustrating components of a basic module and components of a basic map of an embodiment.

FIG. 7B is a diagram illustrating components of the basic module 1300 and components of the basic map 1310, which are illustrated in FIG. 3. The basic module 1300 is a program for managing the mode and the state of the production apparatus, and includes a mode management portion 1301 and a state management portion 1302. The mode management portion 1301 is a program that manages the mode of the apparatus, including an automatic mode and a manual mode. The state management portion 1302 is a program that manages the state of the apparatus, including a start state, a stop state, and an error state.

The basic map 1310 is a list in which an assigned device of the basic module 1300 to the memory is listed. There are types of the basic map 1310 corresponding to the types of the basic module 1300. The basic map 1310 includes information elements that are an assigned device 1311, an assigned device 1312, and an assigned device 1313. The assigned device 1311 is information on the device assigned a flag of an apparatus mode, such as an automatic mode or a manual mode. The assigned device 1312 is information on the device assigned a flag of an apparatus state, such as a start state, a stop state, or an error state. The assigned device 1313 is information on the device, other than the assigned device 1311 and the assigned device 1312, of a memory area used by the basic module 1300. The device assigned for the basic module 1300 is fixed and unchanged in the memory 205, which is illustrated in FIG. 1B.

Figure 7C:
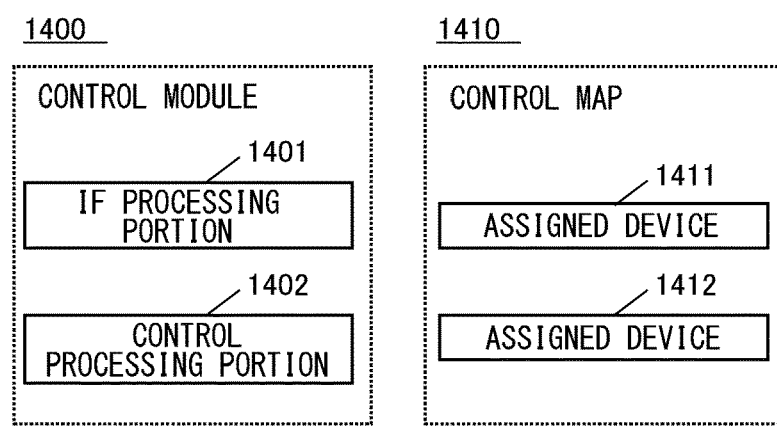
FIG. 7C is a diagram illustrating components of a control module and components of a control map of an embodiment.

FIG. 7C is a diagram illustrating components of the control module 1400 and components of the control map 1410, which are illustrated in FIG. 3. The control module 1400 is a program that controls the controller 140 illustrated in FIG. 1A. Specifically, the control module 1400 is the program that includes an IF processing portion 1401 and a control processing portion 1402. The IF processing portion 1401 is a program that serves as a communication interface. The control processing portion 1402 is a program, other than the IF processing portion 1401, that controls the controller 140 illustrated in FIG. 1A. The control module 1400 is created for each type of the controller 140. The control module 1400 is given a name corresponding to the control module name 1002 illustrated in FIG. 5C, and managed in the control map 1410.

The control map 1410 is a list in which an assigned device of the control module 1400 to the memory is listed. There are types of the control map 1410 corresponding to the types of the control module 1400. The control map 1410 includes information elements that are an assigned device 1411 and an assigned device 1412.

The assigned device 1411 is information on the device assignment related to the connection between the controller 140, which is controlled by the control module 1400 and illustrated in FIG. 1A, and the input processing portion 202 and the output processing portion 203 illustrated in FIG. 1B. The assigned device 1412 is information on the device assignment, other than the assigned device 1411, to a memory area used in the control map 1410.

Figure 8:
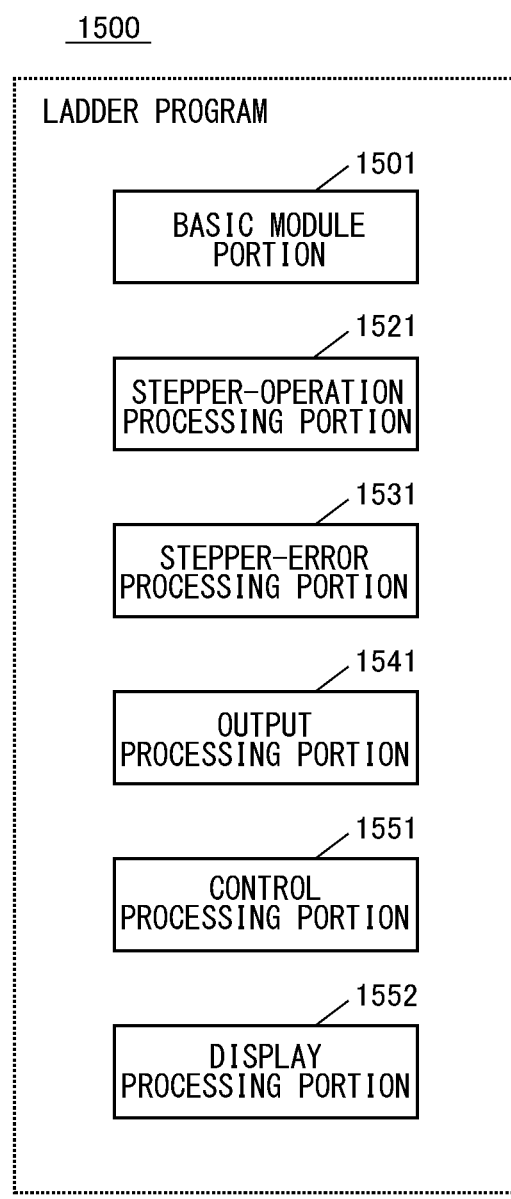
FIG. 8 is a diagram illustrating components of a ladder program of an embodiment.

FIG. 8 is a diagram illustrating components of the ladder program 1500 of the embodiment. The ladder program 1500 generated is a program that causes the sequence control portion 200 illustrated in FIG. 1A to perform the sequence control, and is stored in the storage portion 204 illustrated in FIG. 1B.

As illustrated in FIG. 8, the ladder program 1500 includes a basic module portion 1501, a stepper-operation processing portion 1521, a stepper-error processing portion 1531, an output processing portion 1541, a control processing portion 1551, and a display processing portion 1552.

The basic module portion 1501 is a processing portion that manages the mode and the state of the production apparatus. The basic module portion 1501 is generated as follows. That is, one module of the basic module 1300 stored in the library 410 of FIG. 3 is selected and copied, and the copied module is incorporated into the basic module portion 1501.

The stepper-operation processing portion 1521 is a processing portion that performs the sequence control. The stepper-operation processing portion 1521 is created by using the device information 1120 and the sequence information 1130 illustrated in FIG. 6.

The stepper-error processing portion 1531 is a processing portion that notifies an error. The stepper-error processing portion 1531 is created by using the device information 1120 and the sequence information 1130 illustrated in FIG. 6.

The output processing portion 1541 is a processing portion that causes the operation device 120 illustrated in FIG. 1A and the stepper-operation processing portion 1521 illustrated in FIG. 8 to send an instruction to the device 130 and the controller 140 illustrated in FIG. 1A. The output processing portion 1541 creates an instruction to be outputted, by using the device information 1120 and the sequence information 1130 illustrated in FIG. 6, and the assignment table 800 illustrated in FIG. 3.

The control processing portion 1551 is a processing portion that controls the controller 140 illustrated in FIG. 1A. The control processing portion 1551 is generated as follows. By using the information contained in the management table 1000 of FIG. 5C, the control module 1400 specified by the control module name 1002 and illustrated in FIG. 7C is copied. In addition, the assigned device written in the control map 1410 illustrated in FIG. 7C is changed in accordance with the assigned device 1003 written in FIG. 5C. The information obtained in this manner is incorporated into the control processing portion 1551.

The display processing portion 1552 is a processing portion that displays information on a display device, such as the operation device 120 illustrated in FIG. 1A. The display processing portion 1552 is created by using the device information 1120 and the sequence information 1130 illustrated in FIG. 6, and the assignment table 800 illustrated in FIG. 5A.

The sequence control portion 200, illustrated in FIG. 1A, obtains the ladder program 1500 generated by and outputted from the ladder-program generation apparatus 300. The ladder program 1500 needs to be written in a language that can be processed by the sequence control portion 200, that is, in mnemonic that can be processed by the sequence control portion 200. The sequence control portion 200 is a PLC. The language used in the PLC, that is, the mnemonic varies depending on PLC makers, for example. That is, if the ladder program 1500 is written in predetermined mnemonic, the sequence control portion 200 can control each device, depending on the ladder program 1500. For example, if the mnemonic that can be processed by the sequence control portion 200 is mnemonic A, the ladder program 1500 needs to be written in the mnemonic A. In addition, if the mnemonic that can be processed by the sequence control portion 200 is mnemonic B that is different from the mnemonic A, the ladder program 1500 needs to be written in the mnemonic B.

For this reason, in the present embodiment, the CPU 310, which is illustrated in FIG. 2 and operates depending on the program 2100, performs the following information processing. That is, the CPU 310 performs an intermediate process for generating intermediate information 2000 in predetermined mnemonic. The intermediate process is performed by the CPU 310 that operates depending on the processing program 2110 of the program 2100. In addition, the CPU 310 performs a generation process in which the ladder program 1500 is generated from the intermediate information 2000. The ladder program 1500 is written in mnemonic selected from among a plurality types of mnemonic, which may be different from the predetermined mnemonic. The generation process is performed by the CPU 310 that operates depending on the processing program 2120 of the program 2100. Hereinafter, the operation of the CPU 310 will be described by using specific examples.

FIG. 9 is a diagram illustrating one example of a ladder diagram of the embodiment. A ladder diagram 1600 illustrated in the upper half of FIG. 9 is a ladder diagram of the ladder program 1500 of FIG. 8, expressed in the mnemonic A. In addition, a ladder diagram 1601 illustrated in the lower half of FIG. 9 is a ladder diagram of the ladder program 1500 of FIG. 8, expressed in the mnemonic B that is different in type from the mnemonic A.

FIG. 10 is a diagram illustrating one example of a ladder program of the embodiment. Hereinafter, the ladder program 1500 written in the mnemonic A is referred to as a ladder program 1701, and the ladder program 1500 written in the mnemonic B is referred to as a ladder program 1702. Thus, FIG. 10 illustrates the ladder programs 1701 and 1702, as one example, written in two types of mnemonic. The ladder programs 1701 and 1702 are the same in control, but different in mnemonic.

The ladder programs 1701 and 1702 are written in a format, such as a table format, that can be easily understood by a user. Each of the ladder programs 1701 and 1702 has items of line number, command, and device. In the column of the item of line number, an integer is written. In the column of the item of command, the name of a command is written in mnemonic. In the column of the item of device, the name of a device is written in mnemonic.

As an example, a line with a line number 13 of the ladder program 1701 and a line with a line number 13 of the ladder program 1702 will be described for comparison. In the ladder program 1701, "ANI M30" is written in mnemonic in the columns of the items of command and device. In the ladder program 1702, "ANB MR30" is written in mnemonic in the columns of the items of command and device. Both of the ladder programs 1701 and 1702 express in the line number 13 that an internal relay indicated by the device number is switched off at an A contact and serially connected to a component in front of the internal relay. However, the command and device of the ladder program 1701 is different in mnemonic from those of the ladder program 1702.

Figure 11:
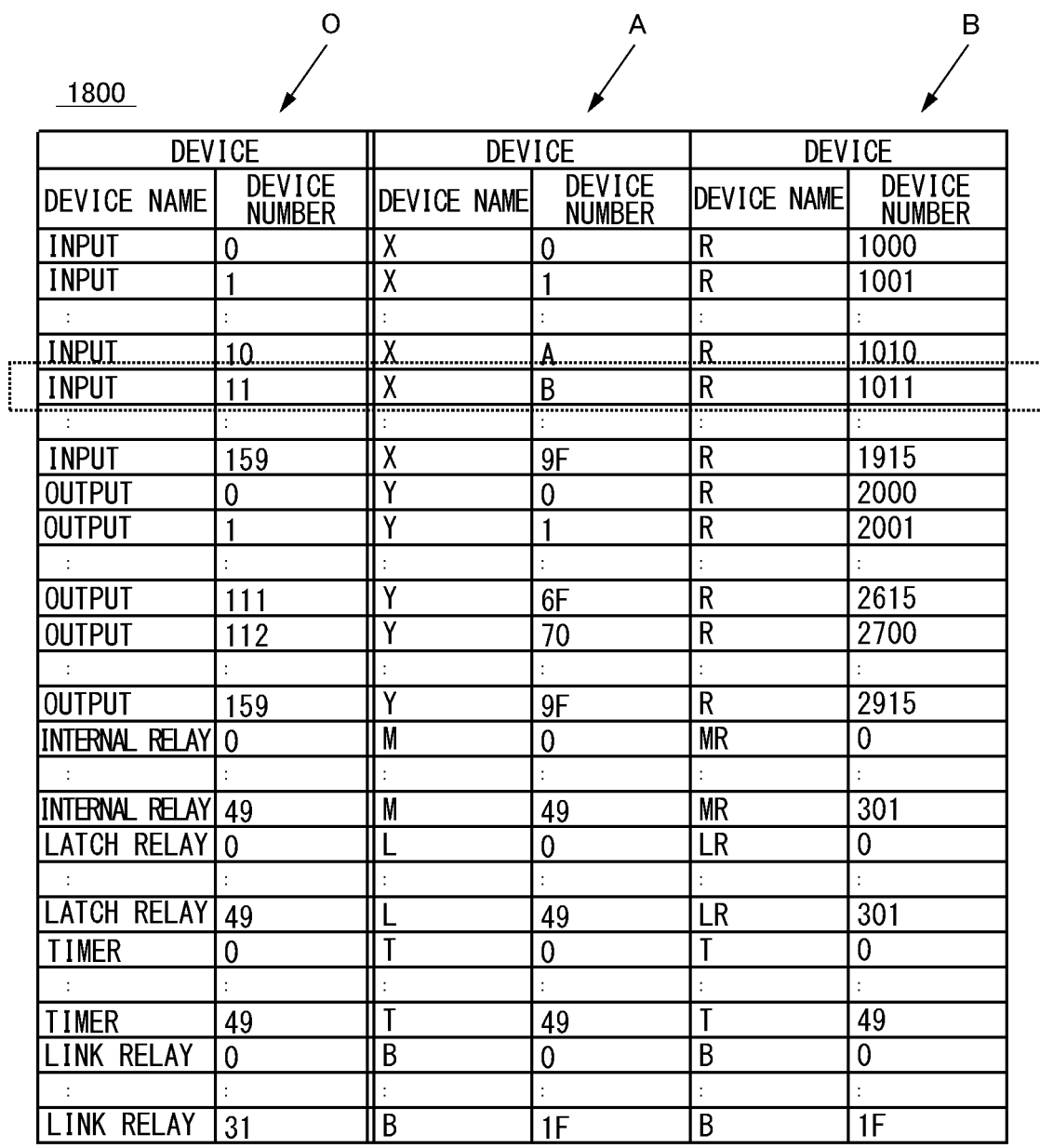
FIG. 11 is a diagram illustrating one example of device definition information of an embodiment.

FIG. 11 is a diagram illustrating one example of the device definition information 1800 illustrated in FIG. 2. The device definition information 1800 is a translation table in which device definition information written in mnemonic O is associated with device definition information written in the mnemonic A and with device definition information written in the mnemonic B.

In the device definition information 1800, the device name and the device number of a device is defined in the mnemonic O used in the intermediate information 2000. In addition, in the device definition information 1800, the device name and the device number of a device is defined in the mnemonic A, associated with the device name and the device number of the device defined in the mnemonic O. Similarly, in the device definition information 1800, the device name and the device number of a device is defined in the mnemonic B, associated with the device name and the device number of the device defined in the mnemonic O.

In the mnemonic O used in the intermediate information 2000, a device name is assigned for each use of device, and a device number is assigned by using a relative value to the top of the cells for the device name. As an example, the description will be made, referring to a line indicated by a broken line of FIG. 11.

A device "XB" written in the mnemonic A and a device "R1011" written in the mnemonic B are an identical device. In the mnemonic O used in the intermediate information 2000, the device associated with "XB" and "R1011" is indirectly defined by using a device name "input" and a device number "11". The device name "input" indicates the use of the device, and the device number "11" is a relative value to the top of the cells for the device name "input".

Figure 12:
FIG. 12 is a diagram illustrating one example of command definition information of an embodiment.

FIG. 12 is a diagram illustrating one example of the command definition information 1900 illustrated in FIG. 2.

The command definition information 1900 is a translation table in which command definition information written in the mnemonic O is associated with command definition information written in the mnemonic A and with command definition information written in the mnemonic B.

In the command definition information 1900, commands are defined in the mnemonic O used in the intermediate information 2000. In addition, in the command definition information 1900, commands that are definition information written in the mnemonic A are defined, associated with the commands that are definition information written in the mnemonic O. Similarly, in the command definition information 1900, commands that are definition information written in the mnemonic B are defined, associated with the commands that are definition information written in the mnemonic O.

In the mnemonic O used in the intermediate information 2000, names used for commands are used. As an example, the description will be made, referring to a line indicated by a broken line of FIG. 12.

Both of a command "ANI" written in the mnemonic A and a command "ANB" written in the mnemonic B are an identical command. This command causes the A contact to be off, and causes a series connection to be established, by using a bit signal. In the mnemonic O used in the intermediate information 2000, the command associated with "ANI" and "ANB" is indirectly defined by using "bit", "A contact", "OFF", and "series".

FIG. 13 is a diagram illustrating one example of the intermediate information 2000 of the embodiment. The intermediate information 2000 is information in which the design information 400 is written as a ladder program in the mnemonic O, by using the device definition information 1800 and the command definition information 1900. The intermediate information 2000 is used for generating the ladder programs 1701 and 1702. In each line of the intermediate information 2000, a numerical number indicating a line number, a command name, and a device name are written. The device name and the command name used in the intermediate information 2000 are a device name and a command name that are indirectly defined in the device definition information 1800 and the command definition information 1900. In the present embodiment, the mnemonic O is a first mnemonic, and the mnemonics A and B are a plurality of second mnemonics, which is different from the mnemonic O.

Figure 14:
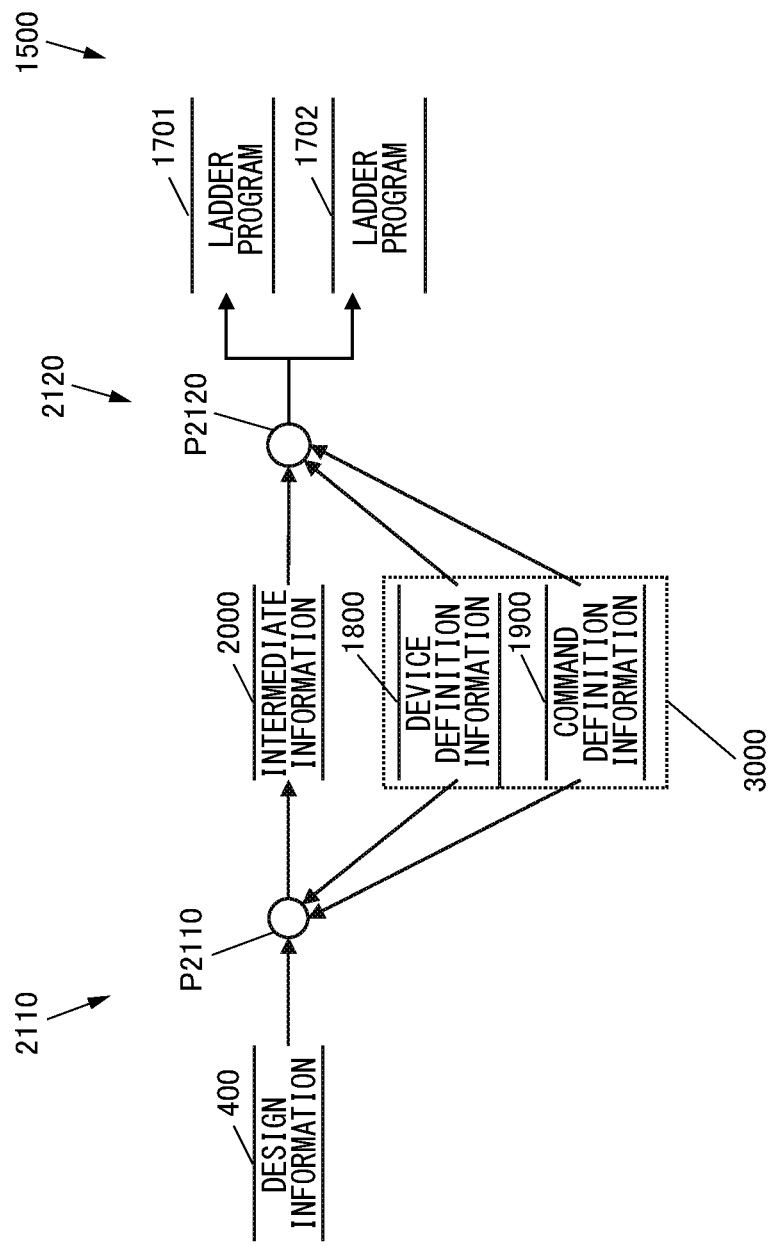
FIG. 14 is a diagram illustrating a procedure for generating a ladder program of an embodiment.

Hereinafter, a procedure for generating a ladder program will be described. FIG. 14 is a diagram illustrating a procedure for generating a ladder program of the embodiment.

The CPU 310 illustrated in FIG. 2 performs an intermediate process P2110 illustrated in FIG. 14, depending on the processing program 2110; and performs a generation process P2120 illustrated in FIG. 14, depending on the processing program 2120.

In the intermediate process P2110, the CPU 310 generates the intermediate information 2000 from the design information 400. When generating the intermediate information 2000, the CPU 310 uses the mnemonic O defined in the device definition information 1800 and the command definition information 1900.

Then, in the generation process P2120, the CPU 310 generates the ladder program 1500 from the intermediate information 2000. When generating the ladder program 1500, the CPU 310 uses mnemonic selected from the plurality of mnemonics A and B. If the mnemonic A is selected, the CPU 310 generates the ladder program 1701, as the ladder program 1500. If the mnemonic B is selected, the CPU 310 generates the ladder program 1702, as the ladder program 1500. If both of the mnemonic A and the mnemonic B are selected, the CPU 310 generates the two ladder programs 1701 and 1702, as the ladder program 1500. Thus, the CPU 310 may generate a plurality of ladder programs by using all of the plurality of mnemonics.

Then, the CPU 310 stores the ladder program 1500 (that is, 1701 and/or 1702) having been generated, in the storage portion 350 illustrated in FIG. 2. The CPU 310 then performs an extraction process P2130 that causes the interface portion 360 to output the ladder program 1500. The output destination of the ladder program 1500 is the sequence control portion 200, but is not limited to this. For example, the output destination may be an external storage (not illustrated). The external storage may be located on a network, or may be directly connected to the ladder-program generation apparatus 300. In this case, the sequence control portion 200 can obtain the ladder program 1500 from the external storage.

The selection information that indicates which type of mnemonic is selected may be prestored in the storage portion 350 of the ladder-program generation apparatus 300, for example. In this case, the CPU 310 may read the selection information from the storage portion 350 when executing the generation process P2120.

Alternatively, the selection information that indicates which type of mnemonic is selected may be inputted by a user through the input device 3300 every time the CPU 310 executes the generation process P2120. That is, desired mnemonic may be selected from among the plurality of mnemonics A and B by a user operating the input device 3300.

In addition, in the present embodiment, the translation table 3000 in which the definition information written in the mnemonic O is associated with the definition information written in the mnemonic A and with the definition information written in the mnemonic B is stored in the storage portion 350, which stores data. Thus, the CPU 310 translates the intermediate information 2000 into the ladder program 1500 in the generation process P2120, by using the translation table 3000.

Hereinafter, a specific example will be described. First, the description will be made for a case where the ladder program 1701 written in the mnemonic A is generated as the ladder program 1500. The CPU 310 translates a device name and a command name written in the mnemonic O in the intermediate information 2000, into a corresponding device name and a corresponding command name written in the mnemonic A, by selecting the device name and the command name in the device definition information 1800 and the command definition information 1900. As an example, a line number 19 of the intermediate information 2000 of FIG. 13 will be described. The CPU 310 refers to the device definition information 1800 of FIG. 11, and translates a device name "output, 112" into a device name "Y70". In addition, the CPU 310 refers to the command definition information 1900 of FIG. 12, and translates a command name "output, direct output" into a command name "OUT". Thus, the information of the line number 19 of the intermediate information 2000 of FIG. 13 is translated into "OUT Y70".

In addition, the description will be made for a case where the ladder program 1702 written in the mnemonic B is generated as the ladder program 1500. The CPU 310 translates a device name and a command name written in the mnemonic O in the intermediate information 2000, into a corresponding device name and a corresponding command name written in the mnemonic B, by selecting the device name and the command name in the device definition information 1800 and the command definition information 1900. As an example, a line number 19 of the intermediate information 2000 of FIG. 13 will be described. The CPU 310 refers to the device definition information 1800 of FIG. 11, and translates a device name "output, 112" into a device name "R2700". In addition, the CPU 310 refers to the command definition information 1900 of FIG. 12, and translates a command name "output, direct output" into a command name "OUT". Thus, the information of the line number 19 of the intermediate information 2000 of FIG. 13 is translated into "OUT R2700".

In the present embodiment, the translation table 3000 stored in the storage portion 350 can be edited. The editing of the translation table 3000 includes creating the translation table 3000, rewriting part or all of the translation table 3000, deleting part of the translation table 3000, and adding information to the translation table 3000. The rewriting of all of the translation table 3000 includes replacing the translation table 3000 stored in the storage portion 350, with another translation table, and rewriting all of a file of the translation table 3000.

Figure 15:
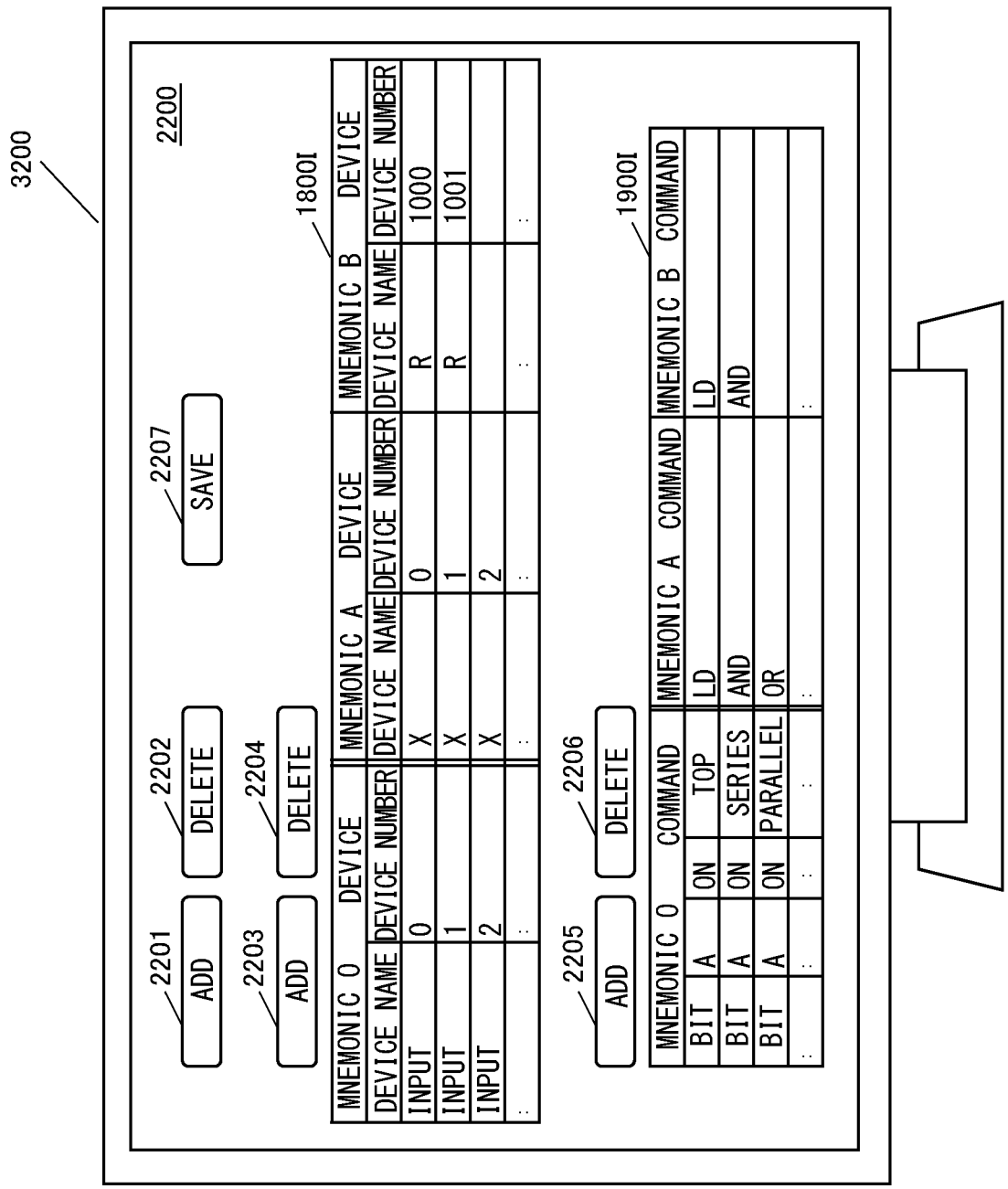
FIG. 15 is a diagram illustrating one example of a setting screen for a translation table of an embodiment.

Hereinafter, a method of editing the device definition information 1800 and the command definition information 1900 of the translation table 3000 will be described. FIG. 15 is a diagram illustrating one example of an editing screen (setting screen) for a translation table of the embodiment.

The CPU 310 causes the display device 3200 to display an image 2200 that supports the editing of the translation table 3000. A user can edit the translation table 3000 by operating the input device 3300 while viewing the image 2200.

The image 2200 contains a table-format image 18001 that shows the device definition information 1800, and a table-format image 19001 that shows the command definition information 1900. In addition, the image 2200 contains an addition button 2201 used for adding a type of mnemonic, and a delete button 2202 used for deleting a type of mnemonic. In addition, the image 2200 contains an addition button 2203 used for adding a line of the device definition information 1800, and a delete button 2204 used for deleting a line of the device definition information 1800. In addition, the image 2200 contains an addition button 2205 used for adding a line of the command definition information 1900, and a delete button 2206 used for deleting a line of the command definition information 1900. In addition, the image 2200 contains a save button 2207 used for saving a result of editing.

The buttons from the addition button 2201 to the save button 2207 can be selected by a user operating the input device 3300. For example, if the input device 3300 includes a mouse, a user can select one of the buttons, which is a group from the addition button 2201 to the save button 2207, by operating the mouse, placing the cursor on the one button, and clicking the mouse.

If the addition button 2201 is selected, a new column that corresponds to a new PLD, or a new mnemonic, is added to the image 18001 and the image 19001. If any one of the columns of the image 18001 or 19001 is selected and the delete button 2202 is selected, the selected column that represents a corresponding mnemonic is deleted from the image 18001 and the image 19001.

If the addition button 2203 is selected, a new line is added to the image 18001. If a line is selected in the image 18001 and the delete button 2204 is selected, the selected line is deleted from the image 18001. If the addition button 2205 is selected, a new line is added to the image 19001. If a line is selected in the image 19001 and the delete button 2206 is selected, the selected line is deleted from the image 19001.

For example, when a user registers a new language specification, that is, a new mnemonic, the user first selects the addition button 2201 and adds a new column to the image 18001 and the image 19001. Then the user enters a device name and a device number specified in the new language specification and corresponding to a device name and a device number in the intermediate information, into the new column added to the image 18001. Then the user enters a command name specified in the new language specification and corresponding to a command name in the intermediate information, into the new column added to the image 19001. After editing the translation table 3000 by using the input device 3300, the user stores the edited translation table 3000 in the storage portion 350 by selecting the save button 2207 contained in the image 2200.

As described above, in the present embodiment, a ladder program can be easily generated automatically in accordance with a language specification, or mnemonic, used in the sequence control portion 200.

Second Embodiment

In the above-described first embodiment, the device definition information 1800 and the command definition information 1900 that constitute the translation table 3000 are set by a user in accordance with a language specification, or mnemonic, of a ladder program into which the user desires to translate the intermediate information. However, the embodiment of the present disclosure is not limited to this. For example, a device element and a command element may be extracted from translated ladder programs (e.g., a ladder program 1701 for A company and a ladder program 1702 for B company), and the device definition information 1800 and the command definition information 1900 may be set by using the extracted elements. Hereinafter, the detailed description thereof will be made. Note that in the following description, a configuration of hardware and control system that is different from that of the first embodiment will be illustrated and described. In addition, since a component of the present embodiment that is identical to a component of the first embodiment has the same configuration and operation, the detailed description thereof will be omitted.

Figure 16:
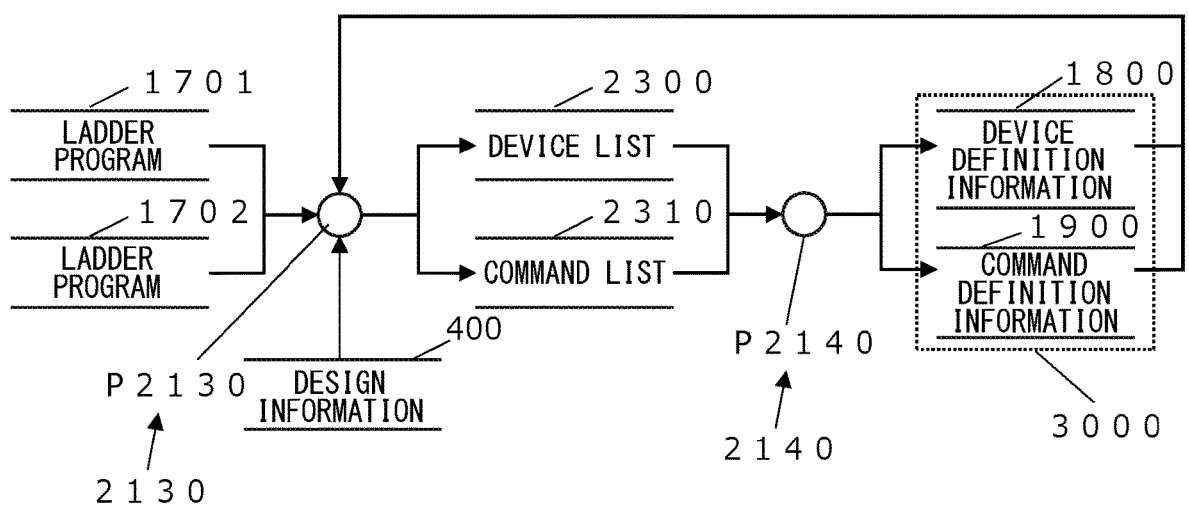
FIG. 16 is a diagram illustrating a procedure for setting definition information of an embodiment.

FIG. 16 is a diagram illustrating a procedure for setting the translation table 3000 (i.e., the device definition information 1800 and the command definition information 1900) by using the ladder programs 1701 and 1702 of the present embodiment. The CPU 310 illustrated in FIG. 2 performs an extraction process P2130 illustrated in FIG. 16, depending on a processing program 2130; and performs a setting process P2140 illustrated in FIG. 16, depending on a processing program 2140.

In the extraction process P2130, the CPU 310 extracts a device element and a command element from the ladder programs 1701 and 1702. In the extraction process P2130, the CPU 310 extracts a device element and a command element written in the mnemonic A, from the ladder program 1701, and extracts a device element and a command element written in the mnemonic B, from the ladder program 1702 (see FIGS. 9 and 10).

FIG. 17 is a diagram illustrating one example of a device list 2300 and a command list 2310. The device list 2300 lists device elements extracted from the ladder programs 1701 and 1702 in the extraction process P2130 of the embodiment. The command list 2310 lists command elements extracted from the ladder programs 1701 and 1702 in the extraction process P2130 of the embodiment.

A device list 2301 lists device elements extracted from the ladder program 1701. A device list 2302 lists device elements extracted from the ladder program 1702. A device list 2303 lists device elements extracted from the ladder program 1500 of the design information 400.

A command list 2311 lists command elements extracted from the ladder program 1701. A command list 2312 lists command elements extracted from the ladder program 1702. A command list 2313 lists command elements extracted from the ladder program (mnemonic O) of the design information 400.

For generating the device list 2300 and the command list 2310, if one device element extracted from the ladder program 1701 is identical to another device element extracted from the ladder program 1701, the CPU 310 deletes the other device element; if one command element extracted from the ladder program 1701 is identical to another command element extracted from the ladder program 1701, the CPU 310 deletes the other command element. Similarly, if one device element extracted from the ladder program 1702 is identical to another device element extracted from the ladder program 1702, the CPU 310 deletes the other device element; if one command element extracted from the ladder program 1702 is identical to another command element extracted from the ladder program 1702, the CPU 310 deletes the other command element. In addition, if there are the device definition information 1800 and the command definition information 1900 that have already been set, the CPU 310 refers to the device definition information 1800 and the command definition information 1900, and associates a device element with a predefined device element, and a command element with a predefined command element for generating the device list 2300 and the command list 2310. For example, in the device list 2301, a device name "M" and a device number "1" written in the mnemonic A have been associated with a device name "internal relay" and a device number "1" written in the mnemonic O. As another example, in the command list 2312, a command "LD" written in the mnemonic B has been associated with a command "bit, A, ON, top" written in the mnemonic O.

However, in the device list 2301, the device element corresponding to a device name "L" and a device number "2" written in the mnemonic A is not registered in the device definition information 1800. In this case, cells for the device name and the device number of the device element to be written in the mnemonic O in the device list 2303 are made blank (as indicated by a box α). Similarly, in the command list 2311, the command element corresponding to a command "ANDFI" written in the mnemonic A is not registered in the command definition information 1900. In this case, a cell for the command of the command element to be written in the mnemonic O in the command list 2313 is made blank (as indicated by a box β).

Referring back to FIG. 16, the CPU 310, in the setting process P2140, causes a user to associate a device element and a command element extracted from the ladder program 1701 or 1702, with a device element and a command element of the ladder program 1500. With this associating process, the device definition information 1800 and the command definition information 1900 are set.

Figure 18:
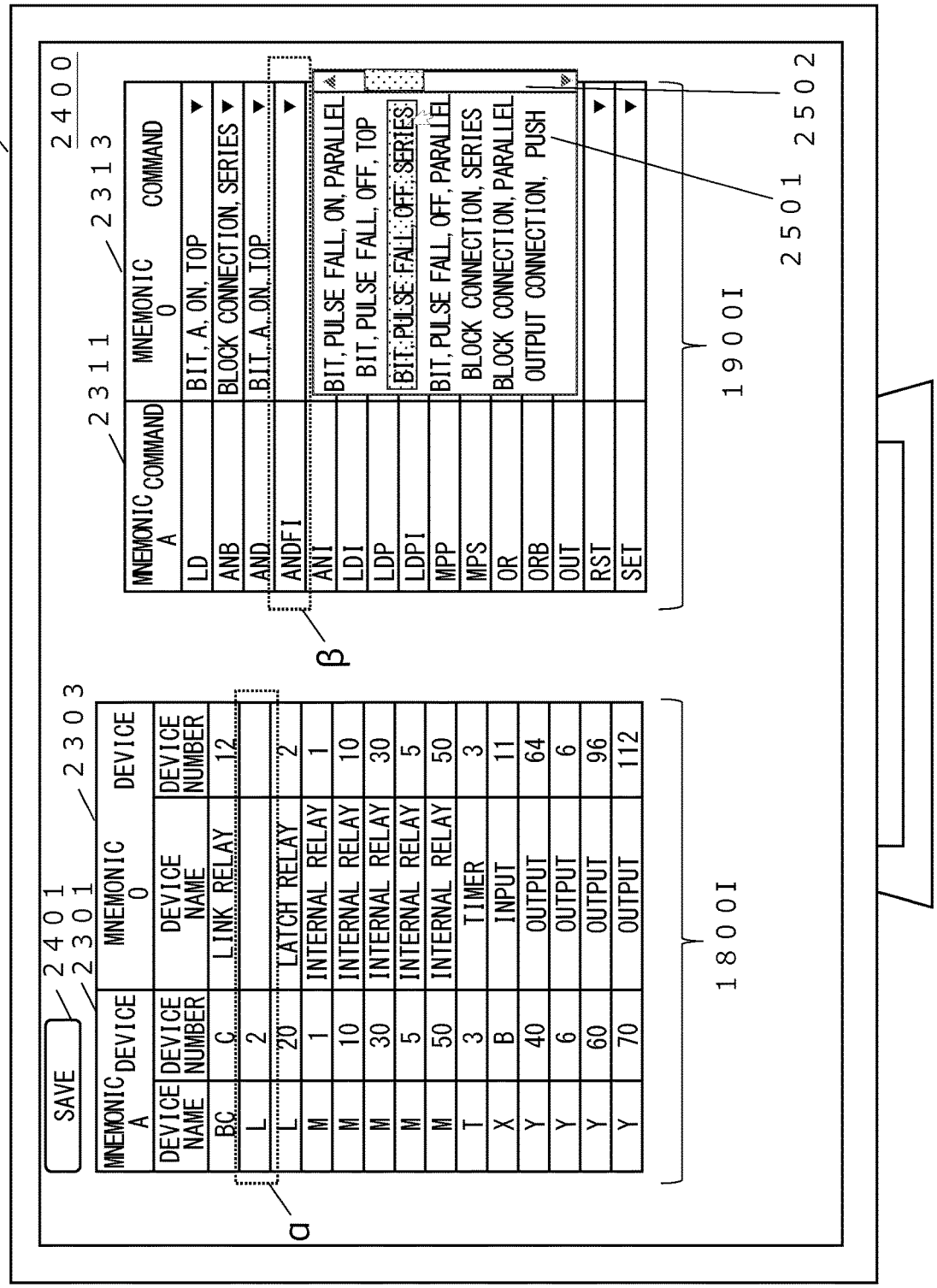
FIG. 18 is a diagram illustrating one example of a setting screen for a translation table of an embodiment.

FIG. 18 is a diagram illustrating one example of a setting screen of the embodiment, for causing a user to set the device definition information 1800 and the command definition information 1900 by using an extracted device element and an extracted command element. The CPU 310 causes the display device 3200 to display an image 2400 that supports the setting of the device definition information 1800 and the command definition information 1900. A user can set the device definition information 1800 and the command definition information 1900 by operating the input device 3300 while viewing the image 2400. Note that FIG. 18 illustrates a case in which an element written in the mnemonic A is associated with an element written in the mnemonic O, for simplifying the description.

The image 2400 contains a device list 2301 of device elements extracted from the ladder program 1701 (mnemonic A) and a device list 2303 of device elements of the ladder program 1500 (mnemonic O), associated with the device elements extracted from the ladder program 1701. Similarly, the image 2400 contains a command list 2311 of command elements extracted from the ladder program 1701 (mnemonic A) and a command list 2313 of command elements of the ladder program 1500 (mnemonic O), associated with the command elements extracted from the ladder program 1701.

An image 18001 is displayed to show the device definition information 1800 such that the device list 2301 and the device list 2303 can be edited. Similarly, an image 19001 is displayed to show the command definition information 1900 such that the command list 2311 and the command list 2313 can be edited. The image 2400 contains a registration button 2401 used for registering the device definition information 1800 and the command definition information 1900 that have been set.

In the setting screen of FIG. 18, a user checks the device elements of the device list 2301 extracted and written in the mnemonic A, and the device elements of the device list 2303. If the device list 2303 contains a blank cell, the user can immediately understand that a device element of the blank cell (as indicated by a box α) is not defined in the device definition information 1800. Thus, the user enters a device name and a device number in the mnemonic O, associating the device name and the device number with a device name "L" and a device number "2" written in the mnemonic A. In this manner, the user can immediately understand which element is not associated with a corresponding element, and can efficiently set the definition information.

In addition, when the associating process is performed, candidates may be shown in a pull-down menu. In the setting screen of FIG. 18, a user checks the command elements of the command list 2311 extracted and written in the mnemonic A, and the command elements of the command list 2313. If the command list 2313 contains a blank cell, the user can immediately understand that a command element of the blank cell (as indicated by a box β) is not defined in the command definition information 1900. When the user enters a command element into the blank cell of the command list 2313, the user causes the command list 2313 to show a pull-down menu 2501, by clicking a down arrow. The pull-down menu 2501 contains a plurality of command elements written in the mnemonic O. The user can view the plurality of command elements of the pull-down menu 2501 by moving a scroll bar 2502. By checking the pull-down menu 2501, the user can easily enter a command element written in the mnemonic O, and more efficiently set the definition information. Such a pull-down menu may be used for entering a device element and setting the device definition information.

After the user sets the device definition information 1800 and the command definition information 1900 and presses the registration button 2401, the CPU 310 stores the device definition information 1800 and the command definition information 1900, which have been set, in the storage portion 350.

As described above, in the present embodiment, a device element and a command element are extracted from a program (mnemonic A or B) into which a program (mnemonic O) has been translated, and displayed such that the device element and the command element can be compared with a device element and a command element of the program (mnemonic O) which has been translated into the program (mnemonic A or B). In this manner, a user can efficiently set the definition information.

Note that although a device element and a command element are extracted from a ladder program in the present embodiment, the device element and the command element may be extracted from a text file, if any, that specifies rules of a language specification used to write the ladder program.

The present invention is not limited to the above-described embodiments, and can be variously modified within the technical concept of the present invention. In addition, since the effects described in the embodiments are those that are most suitably produced from the present invention, the effects of the present invention are not limited to the effects described in the embodiments.

In the above-described embodiments, the description has been made for the case where the ladder-program generation apparatus 300 generates the ladder program 1500 in a text file format. However, the present disclosure is not limited to this. For example, the ladder-program generation apparatus 300 may generate the ladder program 1500 in a binary format.

In addition, in the above-described embodiments, the description has been made for the case where the CPU 310 can generate two types of mnemonic of the ladder program 1500. However, the present disclosure is not limited to this. For example, the CPU 310 may generate three or more types of mnemonic of the ladder program 1500.

In addition, in the above-described embodiments, the description has been made for the case where the production apparatus 100 includes the single sequence control portion 200. However, the present disclosure is not limited to this. For example, the production apparatus 100 may include a plurality of sequence control portions (that is, PLCs) having different language specifications. Even in such a case, the ladder-program generation apparatus 300 can generate ladder programs corresponding to respective sequence control portions, by using respective types of mnemonic.

In addition, the production apparatus may be a piece of mechanical equipment that can automatically perform expansion and contraction, bending and stretching, up-and-down movement, right-and-left movement, pivot, or combined movement thereof, in accordance with information stored in the storage device of the control device.

Modifications

The present invention may be embodied by supplying a program that achieves one or more functions of the above-described embodiments, to a system or a device via a network or a storage medium, and by causing one or more processors of the system or the device to read and execute the program. In addition, the present invention may be embodied by using a circuit (e.g., ASIC) that achieves one or more functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-128756, filed Jul. 30, 2020, and Japanese Patent Application No. 2021-74564, filed Apr. 27, 2021, which are hereby incorporated by reference herein in their entirety.

What is claimed is:

1. An information processing apparatus comprising:
a processing portion configured to perform information processing; and
a display portion configured to display an image,
wherein the processing portion is configured to:
cause the display portion to display a setting screen for a user to associate a first device element written in a first mnemonic and a second device element written in a second mnemonic with each other, and the setting screen for the user to associate a first command element written in the first mnemonic and a second command element written in the second mnemonic with each other, and
obtain definition information in which the first mnemonic and the second mnemonic different from the first mnemonic are associated with each other, based on an input by the user in the setting screen,
wherein a program written in the first mnemonic or the second mnemonic is applied for sequence control of a programmable logic controller (PLC).

2. The information processing apparatus according to claim 1, wherein the processing portion is configured to translate a first program written in the first mnemonic into a second program written in the second mnemonic, by using the definition information.

3. The information processing apparatus according to claim 2, wherein the processing portion is configured to obtain intermediate information used for translating the first program into the second program, by using the definition information.

4. The information processing apparatus according to claim 2, further comprising an output portion configured to output a result obtained through processing performed by the processing portion,
wherein the processing portion is configured to cause the output portion to output the second program.

5. The information processing apparatus according to claim 2, further comprising an input portion configured to be operated by a user,
wherein the processing portion is configured to translate the first program into the second program written in the second mnemonic selected by the user via the input portion.

6. The information processing apparatus according to claim 2, further comprising a storage portion configured to store the definition information,
wherein the processing portion is configured to translate the first program into the second program by using the definition information.

7. The information processing apparatus according to claim 2, wherein the processing portion is configured to obtain the second device element and the second command element written in the second mnemonic, from the second program.

8. The information processing apparatus according to claim 7, wherein the processing portion is configured to obtain the first device element and the first command element written in the first mnemonic, from a design information, and obtain the definition information based on an association information that the user associates the first device element and the second device element and the first command element and the second command element on the setting screen.

9. The information processing apparatus according to claim 2, wherein the first program and the second program are ladder programs.

10. The information processing apparatus according to claim 1, wherein the processing portion is configured to obtain the definition information from design information.

11. The information processing apparatus according to claim 1, wherein the processing portion is configured to cause the display portion to display the second device element or the second command element having already been associated with the first device element or the first command element in the definition information, such that the second device element or the second command element is associated with the first device element or the first command element.

12. The information processing apparatus according to claim 1, wherein if a third device element that is equal to the second device element or a third command element that is equal to the second command element exists, the processing portion deletes the third device element or the third command element and causes the display portion to display the second device element or the second command element.

13. The information processing apparatus according to claim 1, wherein the processing portion is configured to cause the display portion to display candidates of the first device element to be associated with the second device element and the first command element to be associated with the second command element, on the setting screen.

14. The information processing apparatus according to claim 1, wherein at least one of an addition button to newly add the definition information, a delete button to delete the definition information, and a save button to save the definition information that has been set is displayed on the setting screen.

15. The information processing apparatus according to claim 1, wherein the processing portion is configured to:
extract the first device element and the first command element from a first program written in the first mnemonic,
cause the display portion to display a first list that lists the first device element and the first command element,
extract the second device element and the second command element from a second program written in the second mnemonic, and
cause the display portion to display a second list that lists the second device element and the second command element.

16. The information processing apparatus according to claim 15, wherein the first program and the second program are ladder programs, and
wherein the processing portion is configured to extract the first device element and the first command element from a text file that specifies rules of a language specification used to write first program and extract the second device element and the second command element from a text file that specifies rules of a language specification used to write second program.

17. The information processing apparatus according to claim 15, wherein, if the first list or the second list contains a device element or a command element that is not associated with a corresponding element, the processing portion is configured to display the device element or the command element that is not associated with the corresponding element as a blank cell in the first list or the second list.

18. The information processing apparatus according to claim 15, wherein the processing portion is configured to display the device element or the command element of the second list in a pull-down menu shown in the first list and display the device element or the command element of the first list in a pull-down menu shown in the second list.

19. The information processing apparatus according to claim 1, wherein processing portion is further configured to translate a first program written in the first mnemonic into a second program written in the second mnemonic, based on the definition information,
wherein the first program is applied to a first programmable logic controller (PLC) and the second program is applied to a second PLC different from the first PLC.

20. A ladder-program generation apparatus comprising:
a processing portion configured to perform information processing; and
a display portion configured to display an image,
wherein the processing portion is configured to:
cause the display portion to display a setting screen for a user to associate a first device element written in a first mnemonic and a second device element written in a second mnemonic with each other, and the setting screen for the user to associate a first command element written in the first mnemonic and a second command element written in the second mnemonic with each other,
obtain definition information in which the first mnemonic and the second mnemonic different from the first mnemonic are associated with each other, based on an input by the user in the setting screen, and
translate a first ladder program written in the first mnemonic into a second ladder program written in the second mnemonic, by using the definition information, wherein the first ladder program or the second ladder program is applied for sequence control of a programmable logic controller (PLC).

21. An information processing method performed by a processing portion, the method comprising:
   causing a display portion to display a setting screen for a user to associate a first device element written in a first mnemonic and a second device element written in a second mnemonic with each other, and the setting screen for the user to associate a first command element written in the first mnemonic and a second command element written in the second mnemonic with each other, and
   obtaining definition information in which the first mnemonic and the second mnemonic different from the first mnemonic are associated with each other, based on an input by the user in the setting screen,
   wherein a program written in the first mnemonic or the second mnemonic is applied for sequence control of a programmable logic controller (PLC).

22. A computer-readable recording medium storing a program that causes a computer to execute the information processing method according to claim 21.

23. A ladder-program generation method performed by a processing portion, the method comprising:
   causing a display portion to display a setting screen for a user to associate a first device element written in a first mnemonic and a second device element written in a second mnemonic with each other, and the setting screen for the user to associate a first command element written in the first mnemonic and a second command element written in the second mnemonic with each other,
   obtaining definition information in which a first mnemonic and a second mnemonic different from the first mnemonic are associated with each other, based on an input by the user in the setting screen, and
   translating a first ladder program written in the first mnemonic into a second ladder program written in the second mnemonic, by using the definition information,
   wherein the first ladder program or the second ladder program is applied for sequence control of a programmable logic controller (PLC).

24. A method of manufacturing a product, comprising:
   controlling an object, depending on the first ladder program or the second ladder program generated by using the ladder-program generation method according to claim 23.

* * * * *